(12) United States Patent
Linnell et al.

(10) Patent No.: US 8,799,681 B1
(45) Date of Patent: Aug. 5, 2014

(54) REDUNDANT ARRAY OF ENCRYPTING DISKS

(75) Inventors: Thomas E. Linnell, Northborough, MA (US); John S. Harwood, Paxton, MA (US); John T. Fitzgerald, Mansfield, MA (US)

(73) Assignee: EMC Corporation, Hopkinton, MA (US)

( * ) Notice: Subject to any disclaimer, the term of this patent is extended or adjusted under 35 U.S.C. 154(b) by 1068 days.

(21) Appl. No.: 12/043,863

(22) Filed: Mar. 6, 2008

Related U.S. Application Data

(60) Provisional application No. 61/017,137, filed on Dec. 27, 2007.

(51) Int. Cl.
*G06F 12/14* (2006.01)
*G06F 21/62* (2013.01)
*G06F 21/64* (2013.01)
*G06F 11/10* (2006.01)

(52) U.S. Cl.
CPC ............ *G06F 21/62* (2013.01); *G06F 11/1076* (2013.01); *G06F 21/64* (2013.01)
USPC ........................... 713/193; 380/277; 714/6.22

(58) Field of Classification Search
CPC ...... G06F 21/62; G06F 21/64; G06F 11/1076
USPC ......................................................... 713/193
See application file for complete search history.

(56) References Cited

U.S. PATENT DOCUMENTS

| | | | |
|---|---|---|---|
| 5,206,939 A | 4/1993 | Yanai et al. | |
| 5,604,800 A | 2/1997 | Johnson et al. | |
| 5,931,947 A | 8/1999 | Burns et al. | |
| 6,044,468 A | 3/2000 | Osmond | |
| 6,061,770 A | 5/2000 | Franklin | |
| 6,076,148 A | 6/2000 | Kedem | |
| 6,209,059 B1 | 3/2001 | Ofer et al. | |
| 6,493,825 B1 | 12/2002 | Blumenau et al. | |
| 6,502,205 B1 | 12/2002 | Yanai et al. | |
| 6,792,518 B2 | 9/2004 | Armangau et al. | |
| 6,842,810 B1 | 1/2005 | Fitzgerald et al. | |
| 6,976,165 B1 | 12/2005 | Carpentier et al. | |

(Continued)

OTHER PUBLICATIONS

Menezes et al., Handbook of Applied Cryptography, Oct. 17, 1996, pp. 387, 400-402, CRC Press, New York, NY.

Patterson, et al., Introduction to Redundant Arrays of Inexpensive Disks (RAID), Spring CompCon 89, Feb. 27-Mar. 3, 1989, pp. 112-117, IEEE Computer Society, IEEE, New York, NY.

"Introducing RAID 5 on Symmetrix DMX," EMC White Paper, Jan. 19, 2004, 12 pages, EMC Corporation, Hopkinton, MA.

(Continued)

*Primary Examiner* — Matthew Henning
(74) *Attorney, Agent, or Firm* — Richard Auchterlonie; Novak Druce Connolly Bove + Quigg LLP

(57) ABSTRACT

By placing an encryption function below a RAID function and requiring independence of encryption functionality along the same boundaries of data member independence of the RAID function, failures of the encryption and key management for individual encryption functions can be recovered with the same data rebuild mechanism as the RAID function. For example, in a RAID set of disk drives, each data partition and each parity partition has a respective data encryption key for storing encrypted data or encrypted parity in the partition, and a LUN or logical volume is mapped to a stripe of data partitions and an associated parity partition across the RAID set so that the data rebuild mechanism of the RAID function may recover from a loss of a single data encryption key without compromising security of the LUN or logical volume.

18 Claims, 14 Drawing Sheets

(56) References Cited

U.S. PATENT DOCUMENTS

| | | | |
|---|---|---|---|
| 7,010,620 B1 | 3/2006 | Harwood et al. | |
| 7,051,182 B2 | 5/2006 | Blumenau et al. | |
| 7,082,100 B2 | 7/2006 | Linnell et al. | |
| 7,093,021 B2 | 8/2006 | Blumenau et al. | |
| 7,165,152 B2 | 1/2007 | Blumenau et al. | |
| 7,260,636 B2 | 8/2007 | Blumenau et al. | |
| 7,324,648 B1 | 1/2008 | Deaver et al. | |
| 7,458,102 B2 | 11/2008 | Rogers et al. | |
| 7,475,124 B2 | 1/2009 | Jiang et al. | |
| 7,574,560 B2 | 8/2009 | MacHardy et al. | |
| 7,627,756 B2 | 12/2009 | Fujibayashi et al. | |
| 7,716,180 B2 | 5/2010 | Vermeulen et al. | |
| 8,005,227 B1 | 8/2011 | Linnell et al. | |
| 8,010,810 B1 | 8/2011 | Fitzgerald et al. | |
| 8,015,260 B2 * | 9/2011 | Murthy | 709/217 |
| 8,055,911 B2 | 11/2011 | Feng et al. | |
| 8,170,213 B1 | 5/2012 | Harwood et al. | |
| 8,190,921 B1 | 5/2012 | Harwood et al. | |
| 8,261,068 B1 | 9/2012 | Raizen et al. | |
| 8,416,954 B1 | 4/2013 | Raizen et al. | |
| 8,498,417 B1 | 7/2013 | Harwood et al. | |
| 8,588,425 B1 | 11/2013 | Harwood et al. | |
| 2002/0110244 A1* | 8/2002 | Flanagan et al. | 380/277 |
| 2002/0188605 A1 | 12/2002 | Adya et al. | |
| 2003/0021417 A1 | 1/2003 | Vasic et al. | |
| 2003/0046238 A1 | 3/2003 | Nonaka et al. | |
| 2003/0046572 A1 | 3/2003 | Newman et al. | |
| 2003/0115324 A1 | 6/2003 | Blumenau et al. | |
| 2003/0194092 A1 | 10/2003 | Parks et al. | |
| 2004/0139098 A1 | 7/2004 | Margulus et al. | |
| 2005/0013441 A1 | 1/2005 | Klein | |
| 2005/0028072 A1* | 2/2005 | Murthy | 714/805 |
| 2005/0065986 A1 | 3/2005 | Bixby et al. | |
| 2005/0081048 A1* | 4/2005 | Komarla et al. | 713/193 |
| 2005/0226059 A1 | 10/2005 | Kavuri et al. | |
| 2005/0289061 A1* | 12/2005 | Kulakowski et al. | 705/50 |
| 2006/0005048 A1 | 1/2006 | Osaki et al. | |
| 2006/0018484 A1 | 1/2006 | Yoshihiro et al. | |
| 2006/0053308 A1* | 3/2006 | Zimmerman | 713/193 |
| 2006/0062383 A1 | 3/2006 | Kaneda et al. | |
| 2006/0085636 A1 | 4/2006 | Osaki | |
| 2006/0143476 A1* | 6/2006 | McGovern | 713/191 |
| 2006/0143505 A1* | 6/2006 | Olarig et al. | 714/6 |
| 2007/0083657 A1 | 4/2007 | Blumenau et al. | |
| 2007/0101134 A1* | 5/2007 | Parlan et al. | 713/168 |
| 2007/0116287 A1 | 5/2007 | Rasizade et al. | |
| 2007/0179934 A1 | 8/2007 | Basov et al. | |
| 2007/0179990 A1 | 8/2007 | Zimran et al. | |
| 2008/0025514 A1* | 1/2008 | Coombs | 380/277 |
| 2008/0033960 A1 | 2/2008 | Banks et al. | |
| 2008/0065906 A1* | 3/2008 | Itagaki et al. | 713/193 |
| 2008/0082835 A1 | 4/2008 | Asher et al. | |
| 2008/0092029 A1* | 4/2008 | Arakawa et al. | 714/801 |
| 2008/0126813 A1 | 5/2008 | Kawakami | |
| 2008/0219449 A1 | 9/2008 | Ball et al. | |
| 2009/0052670 A1 | 2/2009 | You et al. | |
| 2009/0083485 A1* | 3/2009 | Cheng | 711/114 |

OTHER PUBLICATIONS

"Enginuity: The Symmetrix Storage Operating Environment," EMC White Paper, 2005, 21 pages, EMC Corporation, Hopkinton, MA.
"EMC Symmetrix DMX Architecture," Product Description Guide, 2004, 76 pages, EMC Corporation, Hopkinton, MA.
Symmetrix 8000 Enterprise Storage Systems Product Description Guide, Mar. 2001, 46 pages, EMC Corporation, Hopkinton, MA.
"EMC CLARiiON CX3 Best Practices for Achieving "Five 9s" Availability," Feb. 2007, 14 pages, EMC Corporation, Hopkinton, MA.
Gobioff, et al, "Security for Network Attached Storage Devices," CMU-CS-97-185, Oct. 23, 1997, 20 pages, School of Computer Science, Carnegie Mellon University, Pittsburg, Pennsylvania.
Gibson, et al., "Filesystems for Network-Attached Secure Disks," CMU-CS-97-118, Jul. 1997, 18 pages, School of Computer Science, Carnegie Mellon University, Pittsburg, Pennsylvania.
Gibson, et al., "File Server Scaling with Network-Attached Secure Disks," Proceedings of the ACM International Conference on Measurement and Modeling of Computer Systems (Sigmetrics '97), Seattle, Washington, Jun. 15-18, 1997, p. 272-284, Association for Computing Machinery, New York, NY.
Gibson, et al., "A Case for Network-Attached Secure Disks," CMU-CS-96-142, Sep. 26, 1996, 19 pages, School of Computer Science, Carnegie Mellon University, Pittsburg, Pennsylvania.
Gong. Li, A Security Identity-Based Capability System, Jan. 1989, 16 pages, University of Cambridge Computer Laboratory, Cambridge, England.
IEEE P1619.3(TM)/D1, Draft Standard for Key Management Infrastructure for Cryptographic Protection of Stored Data ( May 2007), 44 pages, IEEE, Piscataway, NJ.
IEEE P1619.1(TM)/D16 Standard for Cryptographic Protection of Data on Block-Oriented Storage Devices (May 2007), IEEE, Piscataway, NJ.
IEEE P1619(TM)/D20 Draft Standard for Authenticated Encryption with Length Expansion for Storage Devices (Jun. 2007), 38 pages, IEEE, Piscataway, NJ.
FIPS Publication 197, Announcing the Advanced Encryption Standard (AES), Nov. 26, 2001, 51 pages, National Institute of Standards and Technology, Gaithersburg, MD.
FIPS Publication 140-2, Security Requirements for Cryptographic Modules, May 25, 2001, 69 pages, National Institute of Standards and Technology, Gaithersburg, MD.
FIPS Publication 198, The Keyed-Hash Message Authentication Code (HMAC), Mar. 6, 2002, 20 pages, National Institute of Standards and Technology, Gaithersburg, MD.
Network Working Group, G. Waters, Editor, "User-based Security Model for SNMPv2," RFC 1910, Feb. 1996, 40 pages, The Internet Society, Reston, VA.
IEEE Project 1619.1 Home, Project Authorization Request (PAR), Standard for Authenticated Encryption with Length Expansion for Storage Devices, internet status page printed Nov. 27, 2007, 3 pages, IEEE, Piscataway, NJ.
IEEE P1619(TM)/D19 Draft Standard for Cryptographic Protection of Data on Block-Oriented Storage Devices (Oct. 2007), IEEE, Piscataway, NJ.
GXC3 Core, P1619 / 802.1ae (MACSec) GCM/XTS/CBC-AES Core, ipcores.com datasheet, Nov. 2007, 3 pages, IP Cores, Inc., Palo Alto, CA.
Maheshwari, Umesh, et al., "How to Build a Trusted Database System on Untrusted Storage," Proceeding OSDI'00 Proceedings of the 4th conference on Symposium on Operating System Design & Implementation, Oct. 23-25, 2000, Paradise Point Resort, San Diego, CA, 16 pages, Proceedings vol. 4, 2000, USENIX Association, Berkeley, CA.
Pariseau, Beth, "Cisco, EMC partner on SAN encryption," ComputerWeekly.com., May 24, 2007, 5 pages, TechTarget, Newton, MA.
Pariseau, Beth, "EMC plans array-based encryption via PowerPath," ComputerWeekly.com, Feb. 8, 2007, 3 pages, TechTarget, Newton, MA.
Scarfone, Karen, et al., Guide to Storage Encryption Technologies for End User Devices, U.S. Department of Commerce Special Publication 800-111, Nov. 2007, 40 pages, National Institute of Standards and Technology Gaithersburg, MD.
EMC Corporation White Paper, Approaches for Encryption of Data-at-Rest in the Enterprise, A Detailed Review, Part No. H4173, Jan. 2008, 24 pages, EMC Corporation, Hopkinton, MA.
"An enterprise strategy for data encryption and key management", 4AA1-6170ENW, Oct. 2007, eight pages, Hewlett-Packard Development Company, Palo Alto, CA.
Tucek, et al., Trade-offs in Protecting Storage: A Meta-Data Comparison of Cryptographic, Backup/Versioning, Immutable/Tamper-Proof, and Redundant Storage Solutions, Mass Storage Systems and Technologies, 2005, Proceedings. 22nd IEEE / 13th NASA Goddard Conference on, Apr. 11-14, 2005, Monterey, CA, pp. 329-340, IEEE, New York, NY.

* cited by examiner

| KEY TABLE ||
|---|---|
| OBJECT ID | WRAPPED KEY INFO. |
| 12345 | --------- |
|  |  |
|  |  |
| ⋮ | ⋮ |

FIG. 2

| DEVICE TABLE ||||
|---|---|---|---|
| OBJECT ID | KEY UUID | DEVICE INFO. | KEY POLICY |
| 12345 | 7890 | --------- |  |
|  |  |  |  |
|  |  |  |  |
| ⋮ | ⋮ | ⋮ |  |

FIG. 3

| KEY STORE ~66 ||||| 
|---|---|---|---|---|
| DOMAIN NAME | OBJECT ID | KEY UUID | WRAPPED KEY INFO. | KEY POLICY |
| EMC98765 | 12345 | 7890 | --------- | ---- |
| | | | | |
| | | | | |
| - - - | - - - | - - - | - - - | - - - |

REDUNDANT ARRAY OF ENCRYPTING DISKS

RELATED APPLICATIONS

This application claims the benefit of Thomas E. Linnell et al., U.S. Provisional Application Ser. 61/017,137 filed 27 Dec. 2007, entitled Redundant Array of Encrypting Disks, incorporated herein by reference.

FIELD OF THE INVENTION

The present invention relates to a storage system that stores data in encrypted form, and performs decryption when the encrypted data is recalled from storage.

BACKGROUND OF THE INVENTION

Storage of data in encrypted form has often been used to preserve secrecy of highly classified government data. More recently there has been an increasing need for businesses to preserve sensitive customer data such as trade secrets, credit card numbers, and medical records. Storage of encrypted data on a data storage device such as a disk drive not only protects against theft of information if the data storage device is stolen, but also protects against inadvertent disclosure if the data storage device is not erased when it is re-configured for another user or retired from service.

A number of encryption techniques have been standardized, and some have been designed for encrypting stored data. One well-known standard encryption technique is the Advanced Encryption Standard (AES) described in the Federal Information Processing Standards (FIPS) Publication 197 published Nov. 26, 2001, by the United States National Institute of Standards and Technology (NIST), Gaithersburg, Md. AES uses a symmetric cryptographic key of 128, 192, or 256 bits to encrypt and decrypt data in blocks of 128 bits.

To encrypt a string of plaintext blocks, a selected encryption mode is layered over AES. Standard encryption modes often layered over AES include the Cipher Block Chaining (CBC) mode, and the XTS mode.

In CBC mode, each plaintext block is exclusive-OR'd with the previous ciphertext block before the plaintext block is encrypted. The first plaintext block in the string is exclusive-OR'd with a pre-selected initialization vector. Decryption is a reverse of this process.

The XTS mode has been designed for encrypting data stored on disk or tape. The XTS mode is described in the Institute for Electrical and Electronic Engineers (IEEE) P1619/D19 Draft Standard for Cryptographic Protection of Data on Block-Oriented Storage Devices (October 2007), IEEE, Piscataway, N.J. In addition to the encryption key used by the AES block cipher, XTS layered over AES (XTS-AES) uses a "tweak key" to incorporate the logical position of the data block into the encryption. XTS-AES addresses threats such as copy-and-paste and dictionary attacks, while allowing parallelization and pipelining in cipher implementations.

Encryption of data for storage and decryption of data upon recall from storage requires some additional data processing resources. More troubling is the fact that encryption affects the reliability of data storage. Use of an improper key during encryption or loss of the proper key for decryption will cause the data to become unavailable or lost. Encryption may also interfere with standard methods of checking and testing data integrity.

To avoid using corrupted keys, some measures should be taken to verify the integrity of the keys in use. One method for ensuring key integrity is by using a "key signature." For example, this could be a Keyed-Hash Message Authentication Code (HMAC) computed over the cipher key using some higher-level key. In a similar fashion, the integrity of the stored ciphertext can be verified by using a HMAC key to compute a Message Authentication Code (MAC) over the ciphertext, and by storing the MAC with the ciphertext so that the MAC can be verified upon recall of the stored ciphertext. These integrity verification techniques are described in the IEEE P1619.1/D20 Draft Standard for Authenticated Encryption with Length Expansion for Storage Devices (June 2007), IEEE, Piscataway, N.J., and the IEEE P1619.3/D1, Draft Standard for Key Management Infrastructure for Cryptographic Protection of Stored Data (May 2007), IEEE, Piscataway, N.J. The HMAC is further described in FIPS Publication 198, The Keyed-Hash Message Authentication Code (HMAC), Mar. 6, 2002, National Institute of Standards and Technology, Gaithersburg, Md.

SUMMARY OF THE INVENTION

In accordance with one aspect, the invention provides a method of storing redundant encrypted data. The method includes computing parity from a first data member and a second data member, encrypting the first data member with a first data encryption key and storing the encrypted first data member in a first data storage device, encrypting the second data member with a second data encryption key and storing the encrypted second data member in a second data storage device, and encrypting the parity with a third data encryption key and storing the encrypted parity in a third data storage device. The method further includes recovering from a failure to read and decrypt data from the encrypted data member in one of the first data storage device and the second data storage device by reading and decrypting data from the other of the first data storage device and the second data storage device and by reading and decrypting parity from the third data storage device and performing a parity computation upon the decrypted data from the other of the first data storage device and the second data storage device and the decrypted parity from the third data storage device.

In accordance with another aspect, the invention provides a redundant storage system for storing encrypted data. The redundant storage system includes an array of data storage devices including at least a first data storage device, a second data storage device, and a third data storage device, and at least one data processor coupled to the data storage devices for storing encrypted data in the data storage devices. The at least one data processor is programmed for computing parity from a first data member and a second data member, encrypting the first data member with a first data encryption key and storing the encrypted first data member in the first data storage device, encrypting the second data member with a second data encryption key and storing the encrypted second data member in the second data storage device, and encrypting the parity with a third data encryption key and storing the encrypted parity in the third data storage device. The at least one data processor is further programmed for recovery from a failure to read and decrypt data from the encrypted data member in one of the first data storage device and the second data storage device by reading and decrypting data from the other of the first data storage device and the second data storage device and by reading and decrypting parity from the third data storage device and performing a parity computation upon the decrypted data from the other of the first data storage device and the second data storage device and the decrypted parity from the third data storage device.

In accordance with another aspect, the invention provides a redundant storage system containing encrypted data. The redundant storage system includes an array of disk drives including at least a first disk drive, a second disk drive, and a third disk drive, and at least one data processor coupled to the disk drives for accessing encrypted data in the disk drives. Each disk drive includes at least a first partition of data storage and a second partition of data storage. Each partition of data storage contains encrypted data or encrypted parity that has been encrypted with a respective different data encryption key for each partition of each of the disk drives. Parity encrypted in one of the first partitions has been computed from the data that is encrypted and stored in the other of the first partitions, and parity encrypted in one of the second partitions has been computed from the data that is encrypted and stored in the other of the second partitions. The at least one data processor is programmed for recovery from a failure to read and decrypt encrypted data in any one of the partitions by reading and decrypting encrypted parity that was computed from the encrypted data in said any one of the partitions and by reading and decrypting encrypted data from other partitions from which the decrypted parity was computed and by performing a parity computation upon the decrypted data and the decrypted parity.

BRIEF DESCRIPTION OF THE DRAWINGS

Additional features and advantages of the invention will be described below with reference to the drawings, in which:

FIG. 2 is a block diagram of a key table introduced in FIG. 1;

FIG. 3 is a block diagram of a device table introduced in FIG. 1;

Figure 1:
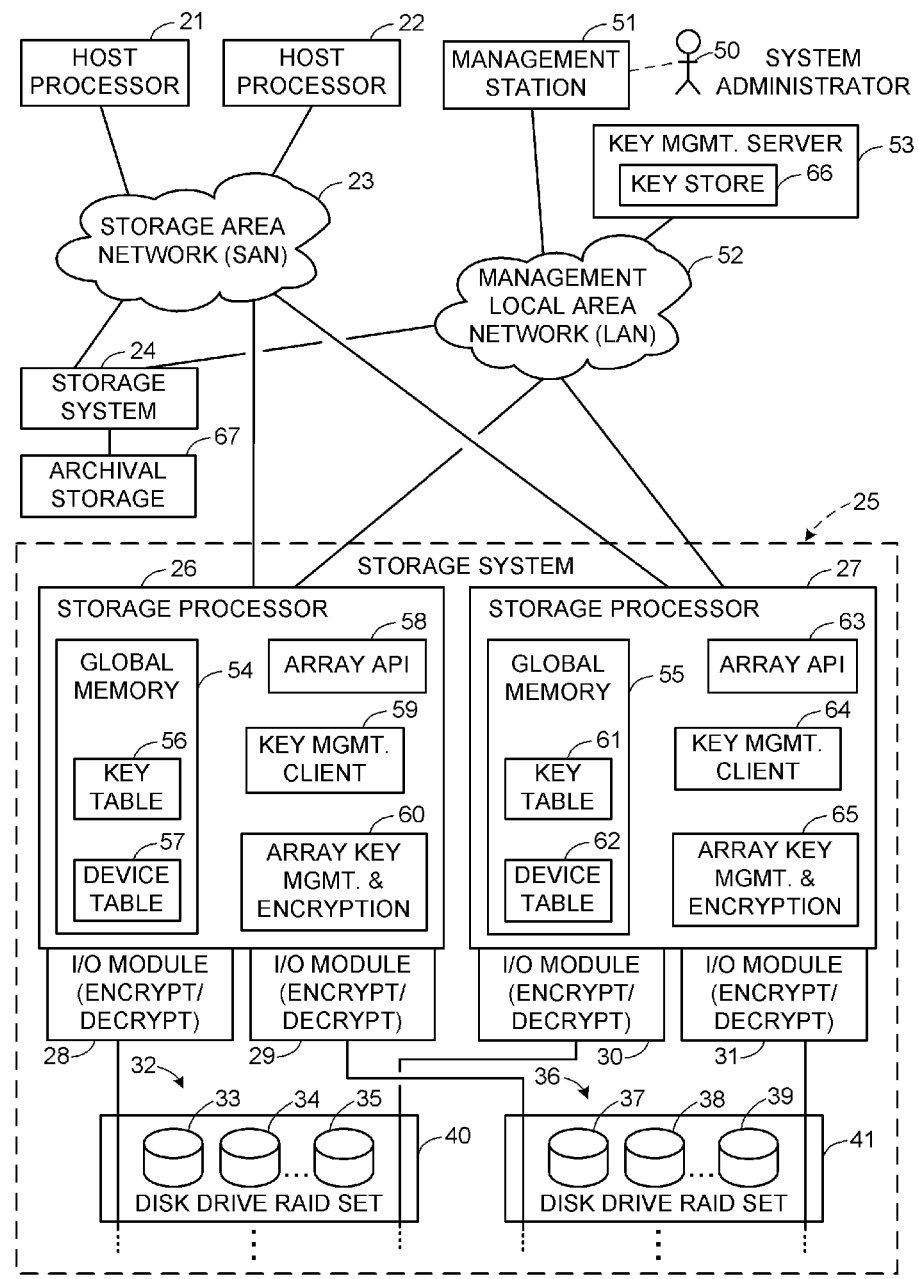
FIG. 1 is block diagram of a data processing system incorporating the present invention for storage of encrypted data.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention for storage of encrypted data. The data processing system includes a number of host processors 21, 22, linked by a storage area network (SAN) 23 to a number of storage systems 24, 25.

The host processors 21, 22 can be general purpose digital computers, or the host processors can be processors programmed for performing dedicated functions such as database management or file system management. For example, the host processors could be general purpose digital computers programmed for scientific or engineering applications. Or the host processors could be file system managers providing network attached storage for a multiplicity of workstations in a business enterprise.

The SAN 23 communicates requests from the host processors 21, 22 to the storage systems for read or write access to specified logical blocks of storage in the storage systems. For example, the storage in each storage system is configured into storage objects such as logical volumes or logical unit numbers (LUNs) of the logical blocks, and each host is given access rights to one or more of the storage objects. The SAN 23, for example, is a Fibre Channel or Internet Protocol (IP) network, and the hosts communicate with the storage systems using the Fibre Channel (FC) protocol or the Small Computer Systems Interface (SCSI) over IP (iSCSI) protocol.

Prior to granting storage access to a host processor, a storage system may require host authentication via a secure mechanism, such as the Kerberos protocol. A storage system may require authentication of each storage access request, for example, using a secure mechanism, such as the protocol described in Blumenau et al. U.S. Pat. No. 7,093,021 issued Aug. 15, 2006.

For enhanced data availability, each storage system 24, 25 includes an array of dual-port disk drives, and a dual-redundant data path and processor architecture. For example, the storage system 25 includes a first storage processor 26 and a second storage processor 27. The first storage processor 26 includes a first input-output (I/.O) module 28 and a second I/O module 29. The second storage processor 27 includes a third I/O module 30 and a fourth I/O module 31.

The storage system 25 includes a first array 32 of disk drives 33, 34, . . . , 35 and a second array 36 of disk drives 37, 38, . . . , 39. Each disk drive in the first array of disk drives 32 is accessible through the first I/O module 28 or through the third I/O module 30. In a similar fashion, each disk drive in the second array of disk drives 36 is accessible through the second I/O module 29 or through the fourth I/O module 31. Therefore each disk drive is accessible regardless of failure of a single one of the processors 26, 27 or a single one of the I/O modules 28, 29, 30, 31.

In each array 32, 36, the disk drives are organized as redundant arrays of inexpensive disks (RAID), such as the RAID set 40 in the first array 32 and the RAID set 41 in the second array 36. For example, when the storage system 25 writes a block of data from a host processor to storage of one of the RAID sets 40, the block of data is written to one of the disk drives 33, 34, 35 in the RAID set, and a corresponding parity block in another one of the disk drives 33, 34, 35 in the RAID set is updated by a read-modify-write process. Later, if an attempt to read the data block from the disk drive fails, then the data block can be recovered (for the case of a single disk drive failure in the RAID set 40) by a parity computation upon the corresponding parity block and corresponding data blocks in the other disk drives of the RAID set. Further details regarding the storage and retrieval of data from a RAID set are found in Patterson, et al., Introduction to Redundant Arrays of Inexpensive Disks (RAID), Spring CompCon 89, Feb. 27-Mar. 3, 1989, pp. 112-117, IEEE Computer Society, IEEE, New York, N.Y.

Prior to host access, a system administrator 50 configures each storage system 24, 25 so that the disk drives of each storage system are grouped into RAID sets, data blocks of the RAID sets are grouped into logical storage objects such as logical volumes or LUNs, and hosts are assigned access rights to one or more of the storage objects. For example, the mapping of logical data blocks to physical disk blocks can be performed by a table lookup, as described in Yanai et al., U.S. Pat. No. 5,206,939 issued Apr. 27, 1993. Hosts can be assigned access rights to one or more of the storage objects by programming an access control list (ACL) for each of the logical storage objects.

In the data processing system of FIG. 1, the system administrator 50 has a management station 51 from which the system administrator may remotely configure each of the storage systems 24, 25. For enhanced reliability and security, the management station 51 is interconnected to the storage systems 24, 25 via a dedicated management local area network (LAN) separate from the storage area network 23. The management LAN 52 may use a secure network communication protocol, or security features may be added to an ordinarily insecure network management protocol, for example, as described in Osmond U.S. Pat. No. 6,044,468 issued Mar. 28, 2000.

The present invention more particularly concerns storage and retrieval of encrypted data using encryption keys. For example, in the data processing system of FIG. 1, the storage system 25 receives plaintext from each host processor 21, 22, and encrypts the plaintext using a data encryption key to produce ciphertext. The ciphertext and not the plaintext is stored on the disk drives in the disk arrays 32, 36. Therefore, the plaintext is not exposed if a disk drive is stolen or if the disk drive is not erased before the disk drive is retired from service or re-assigned to another host.

In a preferred implementation, encryption and decryption is performed in each I/O module 28, 29, 30, and 31. Alternatively, the encryption and decryption could be performed by each storage processor or by an encryption and decryption offload device controlled by the storage processor, so that ciphertext and not plaintext is streamed to an I/O module during a write to storage.

In another alternative arrangement, plaintext is streamed to a disk drive, and a processor in the disk drive is programmed to encrypt the plaintext and store the ciphertext on the disk drive, and to decrypt the ciphertext when the ciphertext is read from the disk drive. For enhanced security, if the encryption or decryption is performed by a processor in the disk drive, then the key for the encryption or decryption is provided to the disk drive only when needed, and it is kept in volatile memory of the disk drive while being used, and erased from the volatile memory as soon as it has been used.

By performing encryption and decryption in each I/O module, it is easy to provide the additional processing resources required for encryption and decryption because the encryption and decryption is pipelined with the other functions of the storage processor. The I/O module can be constructed so that it is compliant with the government standard of FIPS publication 140-2 Security Requirements for Cryptographic Modules, May 25, 2001, National Institute of Standards and Technology, Gaithersburg, Md.

For example, the data processing system has a key management server 53 separate from the storage systems 24, 25. The key management server 53 provides a secure backup for the data encryption keys and key encryption keys used by the storage systems 24, 25. The key management server securely logs key creation and deletion operations. The key management server is maintained with an availability of at least as great as the availability of the storage in the storage systems 24, 25. The key management server 53, for example, is located in a physically secure area including the management station 51. The key management server 53, for example, responds to a "get key" request for a data encryption key from a storage server by returning the data encryption key encrypted with a key encryption key, and sending this "wrapped key" to a storage processor 26, 27 of the storage system 25. For example, the key management server 53 is constructed so that it is compliant with the IEEE P1619.3/D1, Draft Standard for Key Management Infrastructure for Cryptographic Protection of Stored Data (May 2007), IEEE, Piscataway, N.J.

When an I/O module needs a data encryption key, it unwraps the wrapped key by decrypting the wrapped key with the key encryption key. In this fashion, unencrypted data encryption keys may exist only where they can be protected by physical means from unauthorized access. For example, the unencrypted data encryption keys are kept in volatile memory of an application specific integrated circuit (ASIC) in the I/O module, and the ASIC is encased in a fiberglass-epoxy material on the I/O module or encased in another form of a tamper proof or resistant shell or material.

The wrapped data encryption key also includes a redundancy code such as a Message Authentication Code (MAC) so that the I/O module can verify the integrity of the data encryption key before the I/O module uses the data encryption key for encrypting plaintext from a host. If the MAC indicates corruption of the data encryption key, then the I/O module discards the data encryption key, the error is reported to the management station 51, and the storage system sends a "get key" request to the key management server 53 to obtain a new copy of the wrapped data encryption key.

In a similar fashion, the integrity of the stored ciphertext is verified by a redundancy code such as a MAC stored with the ciphertext. When the stored ciphertext is recalled and decrypted in response to a read request from a host processor, the redundancy code is verified. If the redundancy code indicates corruption, then the decrypted plaintext is discarded. An attempt is made to recover from this error by accessing each corresponding parity block and its related data blocks on the RAID set, re-computing the ciphertext using a parity calculation upon the corresponding parity blocks and their related data blocks on the RAID set, and again decrypting this recomputed ciphertext.

The detection of key or data corruption, and recovery from a single-disk error in a RAID set, however, might not be sufficient to recover data that has become unavailable due to use of an improper key during encryption or loss of the proper key for decryption. To ensure availability of a proper key for encryption and decryption of each storage object to be encrypted or decrypted, the storage systems 24, 25 and the key management server 53 maintain an association of object identifiers and respective data encryption keys for the storage objects to be encrypted or decrypted. In particular, when a data encryption key is assigned to a storage object, the data encryption key is associated with an object identifier identifying the storage object. The object identifier is linked to both the data encryption key and the storage object throughout the life of the data encryption key.

To ensure that a wrong key is not used during encryption or decryption of a storage object, the object identifier is verified prior to any use of the data encryption key for the storage object and performance of any I/O operation upon the storage object. For example, the data encryption key for the storage object is cryptographically bound to the object identifier of the storage object to provide an end-to-end key correctness check. Before the data encryption key is used for encrypting or decrypting a storage object, the object identifier bound to the data encryption key is tested to determine whether or not it identifies the storage object to be encrypted or decrypted. If the object identifier bound to the data encryption key does not identify the storage object to be encrypted or decrypted, then the data encryption key is a wrong key for encrypting or decrypting the storage object.

For example, wrapped key information for a storage object is produced by encrypting a combination of the data encryption key for the storage object and the object identifier for the storage object. When the I/O module is requested to encrypt or decrypt the storage object, the I/O module is given an object ID identifying the storage object, and the I/O module is also given wrapped key information. The I/O module "unwraps" the wrapped key information by decrypting the wrapped key information with a key encryption key to produce an unwrapped data encryption key and an unwrapped object identifier. The I/O module compares the unwrapped object identifier to the object identifier of the storage object to be encrypted or decrypted, and if the unwrapped object identifier is different from the object identifier of the storage object to be encrypted or decrypted, then the I/O module returns an error instead of encrypting or decrypting the storage object with the unwrapped data encryption key.

A catastrophic failure could cause confusion of the object identifiers and their associated data encryption keys so that the cryptographic binding of the object identifiers to the keys would not necessarily detect use of the wrong key for encryption or decryption. A catastrophic failure also could cause a loss of the association of an object identifier with its associated data encryption key. For example, in a data processing system having multiple storage systems sharing a key management server but having separate namespaces for storage objects, recovery from a catastrophic failure could cause a data encryption key for a storage object encrypted on one of the storage systems to become confused the data encryption key for a storage object encrypted on another one of the storage systems. A similar problem could arise when a storage system attempts to decrypt a backup or archive copy that was encrypted on another storage system having a different namespace, and the storage system cannot find the object ID of the backup or archive copy in its own namespace.

To provide a failsafe key recovery mechanism in the event of confusion or loss of the association of an object identifier with its respective data encryption key, the storage systems 24, 25 and the key management server 53 also maintain a backup index to the data encryption keys in the key server context. The backup index associates the object identifiers and their data encryption keys with an absolute key reference. If a storage system has a data encryption failure when using a data encryption key that passes the key correctness check, then the storage system can use the absolute key reference to request a new copy of the data encryption key from the key management server 53.

A storage system can also use the absolute key reference to request the correct encryption key from the key management server 53 when the storage system cannot find, in its own namespace, the object ID of a backup or archive copy of a storage object. In the storage system of FIG. 1, for example, the storage system 24 may access archival storage 67 containing backup copies of objects in its own storage as well as backup copies of objects from the storage system 25. In this case, the storage system 24 may obtain the absolute key reference for a backup copy of an object from an index of the backup or archive copies, or from unencrypted metadata stored with the backup or archive copy. Thus, the absolute key reference can be used as a failsafe, key of last resort, to recover customer data in enterprise applications.

For example, in global memory 54, 55 of the storage processors 26, 27 of the storage system 25 of FIG. 1, there is kept a dual mapping of the relationship of storage objects to their data encryption keys. The global memory 54 of the first storage processor 26 includes a key table 56 providing a mapping of storage objects in the disk storage arrays 32, 36 to their respective wrapped data encryption keys, and a device table 57 providing a mapping of each storage object to one or more storage devices in the disk storage arrays. The device table 57 further provides a mapping of each storage object to the absolute key reference of the data encryption key for encrypting or decrypting the storage object.

For example, the first storage processor 26 is programmed with an array application program interface (API) 58 for receiving configuration and control commands from the management station 51. The first storage processor 26 is also programmed with a key management client 59 for sending "get key" requests to the key management server 53 and receiving replies from the key management server. The first storage processor 26 is further programmed with an array key management and encryption program module 60.

In a similar fashion, the global memory 55 of the second storage processor 27 also includes a key table 61, a device table 62, a key management client 64, and an array key management and encryption module 65. For redundancy, the key table 61 is maintained as a copy of the key table 56, and the device table 62 is maintained as a copy of the device table 57. Any updates to the key table 56 or the device table 57 are mirrored to the key table 61 or the device table 62, and any updates to the key table 61 or the device table 62 are mirrored to the key table 56 or the device table 57.

As shown in FIG. 2, the key table 56 stores object identifiers in association with their respective wrapped data encryption key information.

As shown in FIG. 3, the device table 57 stores the object identifiers in association with respective globally unique key identifiers (KEY UUID), respective device information, and respective key policy information. Each globally unique key identifier is unique with respect to the set of all data encryption keys used by the storage systems serviced by the key management server (53 in FIG. 1).

The device information in the third column of the device table 57 specifies a mapping of the logical extent of each storage object to storage of one or more of the disk drives in the disk arrays 32 and 36. In general, the mapping of the logical extent of a storage object could be specified by a list of disk drive identifiers and an offset and extent for each of the disk drives. In practice, it is more convenient for the system administrator to configure the storage of the disk array into more regular sized storage objects, such as partitions of the disk drives, entire disk drive, stripes of data across the disk drives in the RAID sets, or the data storage of entire RAID sets. For example, the device information includes a RAID set identifier and an identifier of a particular disk drive partition within the RAID set or a particular data stripe across the disk drives in the RAID set. The device information for the storage object may also include a pointer to an access control list (ACL) specifying particular host processors having rights to access the storage object.

The key policy information specifies a block encryption algorithm in which the data encryption is used, a mode for encrypting a string of plaintext blocks using the block encryption algorithm, the key length, a key format, and a key lifetime. For example, the block encryption algorithm is AES, the mode is CBC or XTS, the key length is either 128 bits or 256 bits. The key format is either an unwrapped data encryption key, a data encryption key wrapped with a key encryption key, or a data encryption key and object data wrapped via a key encryption key. The default for the key lifetime is no expiration.

Figures 4, 5:
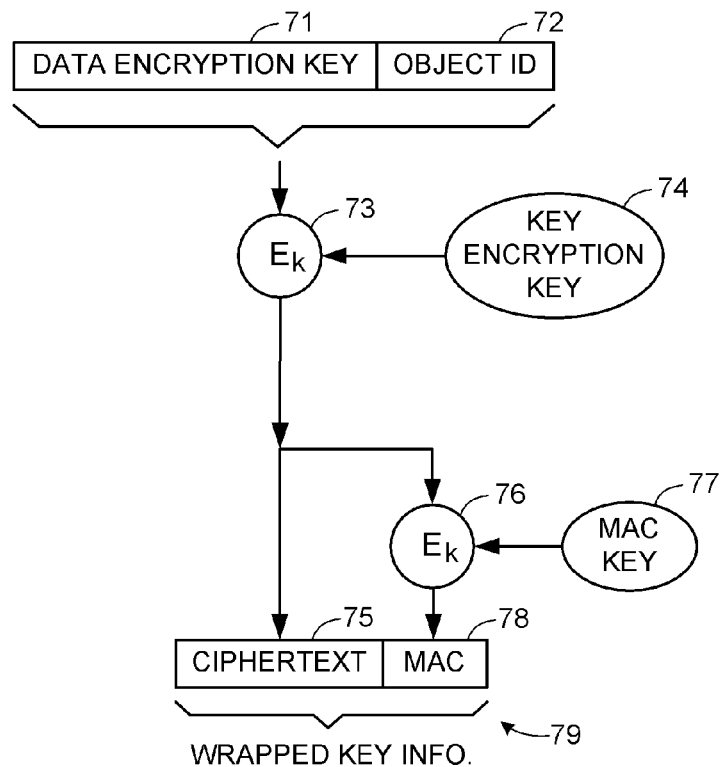
FIG. 4 is a block diagram of a key store introduced in FIG. 1.
FIG. 5 is a flow diagram of a process of encrypting a data encryption key together with information to be associated with the data encryption key to produce wrapped key information.

FIG. 4 shows the key store 66 containing the wrapped data encryption keys in the key management server (53 in FIG. 1). The key store 66 is organized as a table associating the wrapped key information for each data encryption key with a domain name, an object ID, a key UUID. The domain name identifies a domain within which each object ID is unique. For example, each storage system is a separate domain, and the domain name is a unique name for the storage system, such as a Universal Resource Identifier (URI) for the storage system. The key UUID is unique across all of the domains. For example, each time that the key management server puts wrapped key information for a new data encryption key into the key store, the key management server puts a new unique key UUID in the key store 66 in association with the wrapped key information.

When presented with a "get key" request including either a globally unique key identifier or an object ID from a key management client (59, 64 in FIG. 1), the key management server (53 in FIG. 1), for example, looks up the wrapped key information associated with this globally unique key identifier or object ID in the key store 66 and returns this wrapped key information to the key management client.

In an alternative construction for the key store 66, the key store 66 contains unwrapped data encryption keys instead of wrapped key information of the data encryption keys. In this case, when presented with a "get key" request, and based on the "get key" request and the key management client that originated the request, the key management server (53 in FIG. 1) looks up the unwrapped data encryption key associated with the globally unique key identifier or object ID in the key store 66, and then "wraps up" this data encryption key with its associated object ID, and returns this wrapped key information to the key management client.

FIG. 5 shows a process of creating the wrapped key information. For example, this process is performed by the key management server (53 in FIG. 1) when a key management client first requests a data encryption key for an object, or on all requests. In an alternative construction for the key management server, when the key management server receives the first request for a data encryption key for an object from a key management client, the key management server requests an I/O module of the storage processor of the key management client to create the wrapped key information and return the wrapped key information to the key management server.

To perform the process of FIG. 5, a new data encryption key 71 is produced by a secure pseudo-random number generator. This data encryption key 71 is concatenated with the object ID 72 of the object to be encrypted with the data encryption key. The combination of the data encryption key 71 and the object ID 72 is encrypted (step 73) with a key encryption key 74 to produce ciphertext 75. The key encryption key 74, for example, is unique to one or more of the I/O modules of the storage system of the key management client that is requesting the wrapped key information. At this time, the I/O modules of the storage processor have already been securely programmed with the key encryption key 74.

For example, in the storage system 25 of FIG. 1, the I/O modules 28 and 30 are programmed with one key encryption key, and the I/O modules 29 and 31 are programmed with another key encryption key. Each storage object in the storage system 25 is stored in either the first disk drive array 32 or in the second disk drive array 36. In this example, the particular storage array and I/O modules associated with the object are found by decoding the object ID. An object having an even object ID is stored in the first storage array 32 and accessed via the I/O module 28 or the I/O module 30, and an object having an odd object ID is stored in the second storage array 36 and accessed via the I/O module 29 or the I/O module 31.

In FIG. 5, for detection of key corruption, the ciphertext 75 is encrypted (step 76) by a MAC key 77 to produce a MAC 78. The MAC 78 is concatenated with the ciphertext 75 to produce the wrapped key information.

Figure 6:
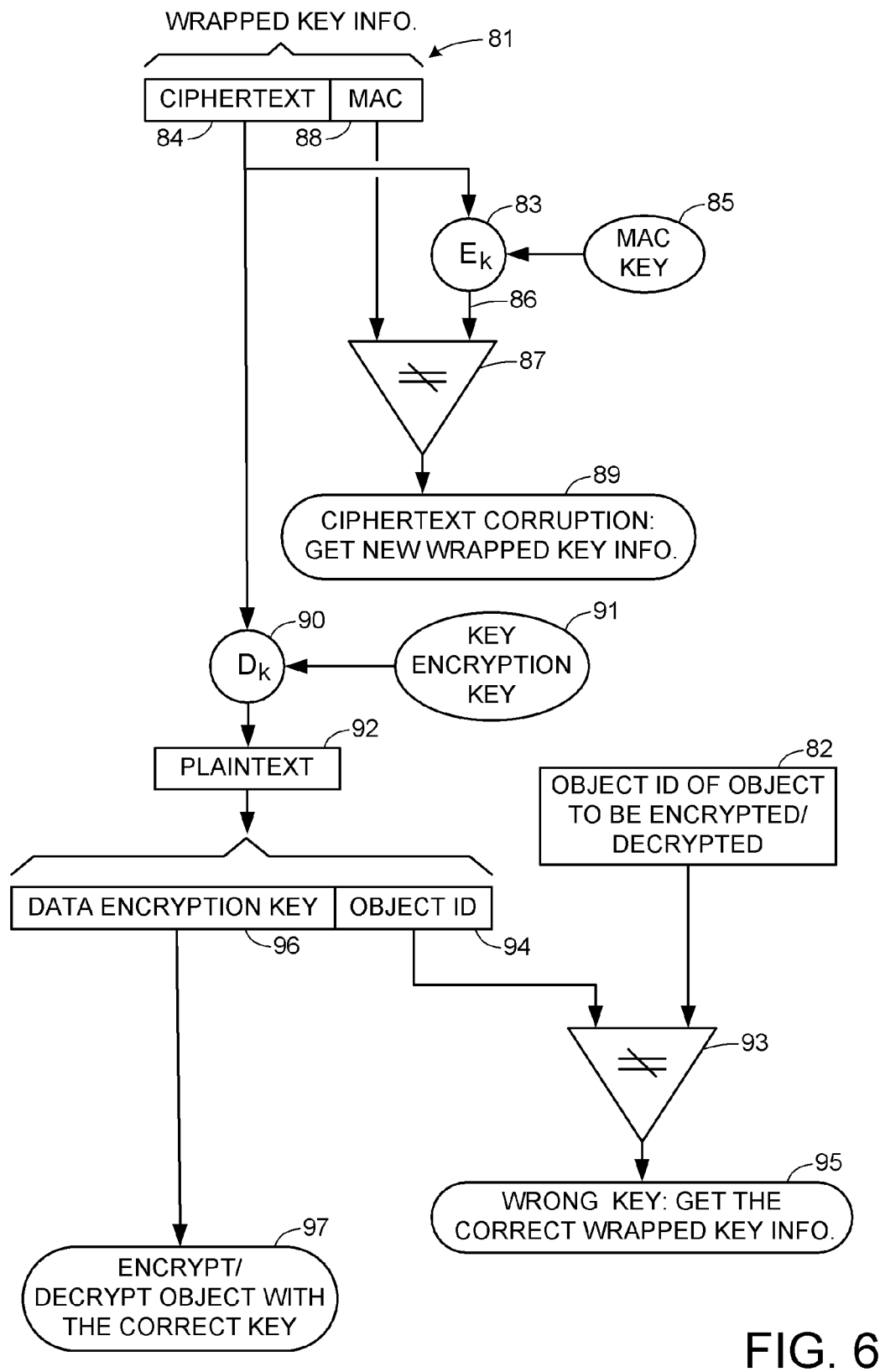
FIG. 6 is a flow diagram of a process of decoding, checking, and decrypting wrapped key information to produce a data encryption key for a specified data storage object.

FIG. 6 shows how an I/O module checks and decrypts the wrapped key information whenever an array key management and encryption module requests the I/O module to write encrypted data of an object to disk or read encrypted data of a storage object from disk. The array key management and encryption module provides, to the I/O module, wrapped key information 81 and an object ID 82 of the object to be encrypted or decrypted. The I/O module encrypts (step 83) the ciphertext 84 in the wrapped key information 81 with the MAC key 85 to produce an encryption result 86 that is compared (step 87) to the MAC 88 in the wrapped key information. If the comparison 87 indicates that the encryption result 86 is different from the MAC 88, then the ciphertext 84 is most likely corrupted, and the I/O module returns an error to the array key management and encryption module. In this case, the array key management and encryption module invokes its key management client to request a new copy of the wrapped key information from the key management server (step 89) in an attempt to recover from the error by re-initiating the process of FIG. 6 upon the new copy of the wrapped key information.

If the comparison 87 indicates that the encryption result 86 is the same as the MAC 88, then the I/O module decrypts (step 90) the ciphertext 84 of the wrapped key information 81 with the I/O module's key encryption key 91 to produce plaintext 92. The object ID 82 of the storage object to the encrypted or decrypted is compared (step 93) to the object ID 94 that was unwrapped from the wrapped key information 81 and appears in the plaintext 92. If the comparison 93 indicates that the object ID 82 of the storage object to the encrypted or decrypted is different from the object ID 94 unwrapped from the wrapped key information 81, then the data encryption key 96 unwrapped from the wrapped key information 81 is most likely a wrong data encryption key for encrypting or decrypting the storage object identified by the object ID 82. Therefore, in this case, the I/O module returns an error to the array key management and encryption module, and in response, the array key management and encryption module invokes its key management client to request a new copy of the wrapped data encryption key from the key management server (step 95) in an attempt to recover from the error by re-initiating the process of FIG. 6 upon the new copy of the wrapped key information.

If the comparison in step 93 indicates that the object ID 82 of the storage object to the encrypted or decrypted is the same as the object ID 94 unwrapped from the wrapped key information 81, then the data encryption key 96 unwrapped from the wrapped key information 81 and appearing in the plaintext 92 is most likely the correct key for decrypting the storage object. The I/O module encrypts or decrypts (step 97) the storage object with this data encryption key 96.

Figure 7:
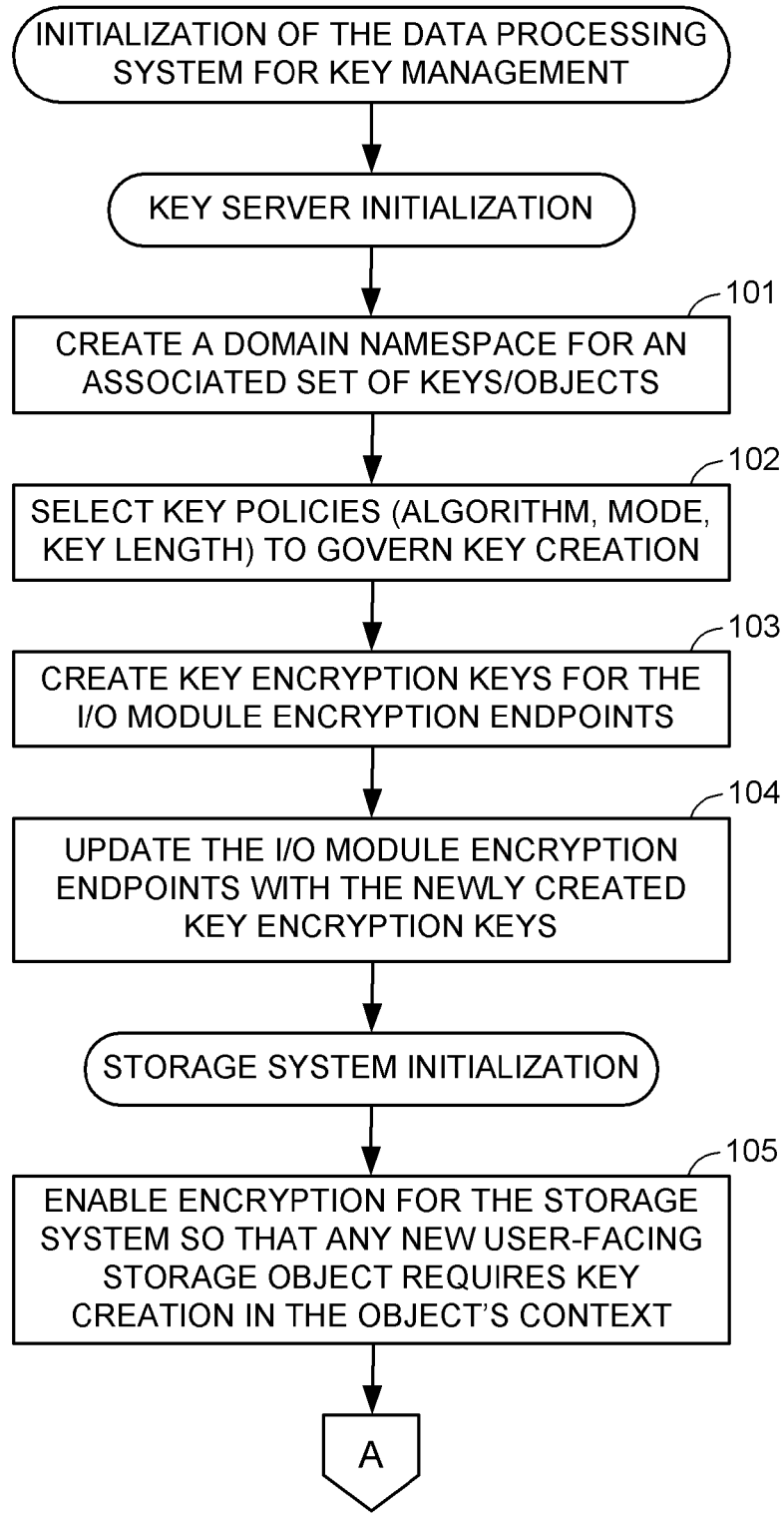
FIGS. 7 and 8 together comprise a flowchart of a procedure for initialization of the data processing system of FIG. 1 for key management.
Figure 8:
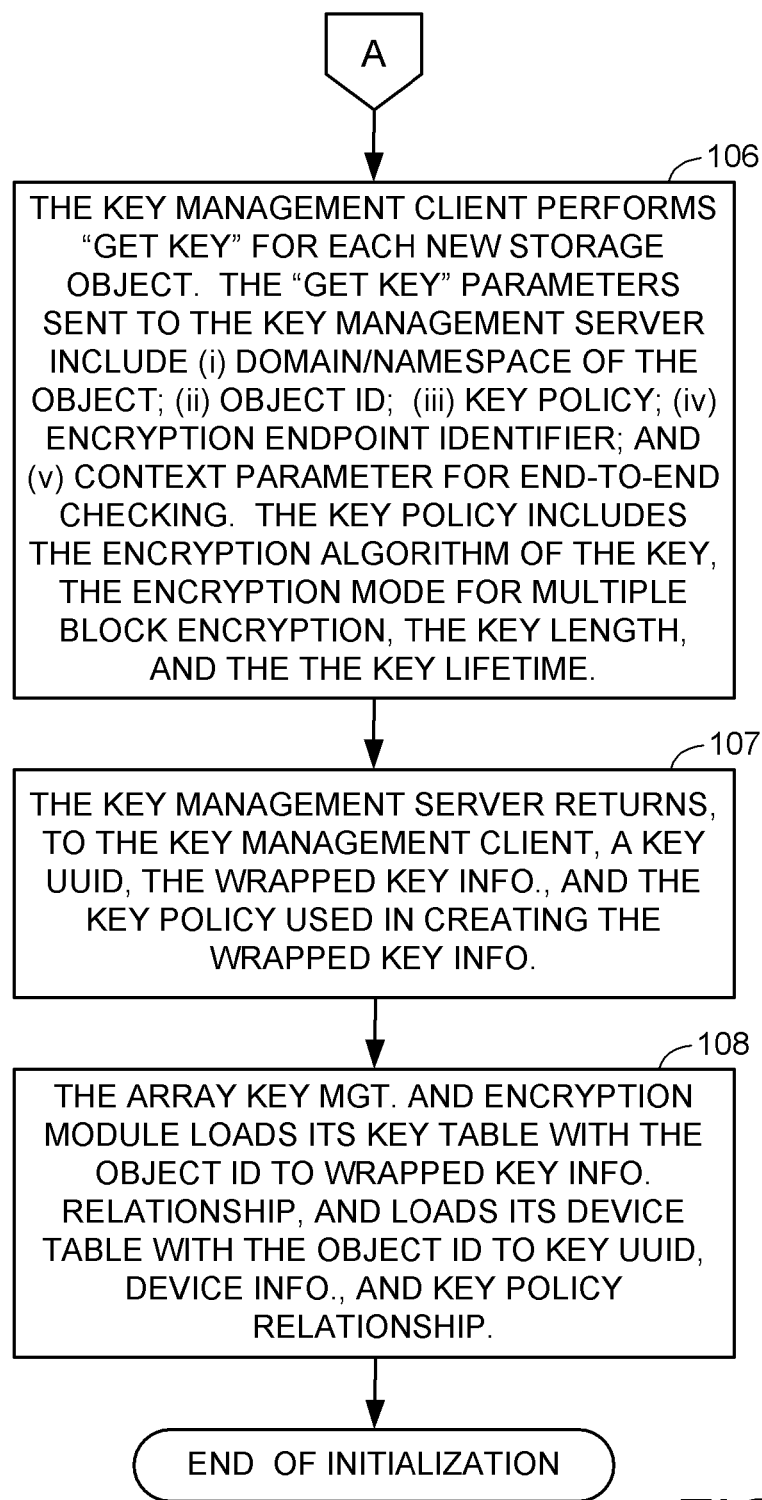

FIGS. 7 and 8 show a procedure for initialization of the data processing system of FIG. 1 for key management. This procedure includes key management server initialization (steps 101 to 104) followed by storage system initialization (steps 105 to 108).

In a first step of 101 of FIG. 7, the system administrator creates a domain namespace in the key management server for an associated set of keys and objects of a storage system. For example, the system administrator loads the key management server with the URI name of the storage system, and the key management server checks whether or not it already has been loaded with this URI name, and replies with an indication of success that the name has been accepted as a new name or an error message that the name has already been registered.

In step 102, the system administrator selects key policies in the key management server to govern key creation for the domain namespace. For example, the system administrator may specify that all data encryption keys for the domain namespace are to be wrapped with an associated object ID and encrypted with a key encryption key using a specified block encryption algorithm, mode, key length, and key lifetime.

In step 103, the system administrator requests the key management server to create key encryption keys for I/O module encryption endpoints in the domain namespace. The key management server creates the key encryption keys, and transmits them to the I/O module encryption endpoints in the domain namespace. In step 104, the I/O modules are updated with the newly created key encryption keys. For example, when the I/O modules are manufactured, they are initially programmed with well known key encryption keys, which must be updated before the I/O modules will perform encryption or decryption.

In step 105, the system administrator enables encryption for the storage system so that any new user-facing storage object requires key creation in the object's context. Therefore, in step 106, when a storage processor services a host processor request for creation of a new storage object, the key management client of the storage processor issues a "get key" request to the key management server for the new storage object. The "get key" parameters sent to the key management server include: (i) the domain name of the namespace of the storage object; (ii) the object ID; (iii) the key policy; (iv) an encryption endpoint identifier; and (v) a context parameter for end-to-end checking. The key policy includes the block encryption algorithm for the key, the encryption mode for multiple block encryption, the key length, and the key lifetime.

The key management server checks the "get key" parameters against the context parameter to detect any corruption of the "get key" parameters, looks up the specified domain name to verify that the domain name has been registered, and compares the requested key policy with any key policy requirements that have been registered with the domain name, in order to select a key policy for creating the requested key. The key management server does a lookup of the object ID in existing entries in the key store for the domain name in order to determine whether a key has already been assigned to the specified object ID in the namespace of the specified domain name. The key management server returns an error message if the key management server requests a key for a new object and the server already finds that a data encryption key has already been created for the object. Otherwise, in accordance with the selected key policy, the key management server creates a new key UUID and a new data encryption key and encodes the new data encryption key together with the specified object ID with the key encryption key for the specified encryption endpoint in the namespace of the specified domain.

In step 107, the key management server returns, to the key management client, the key UUID, the wrapped key information, and the selected key policy that was actually used in creating the wrapped key. In step 108, the array key management and encryption module loads its key table with the object ID to wrapped key info. relationship, and loads its device table with the object ID to key UUID, device info., and key policy relationship. At this point, the key management server and the storage system have been initialized for encryption or decryption of the object and for recovery from corruption of the key information for the object.

Figure 9:
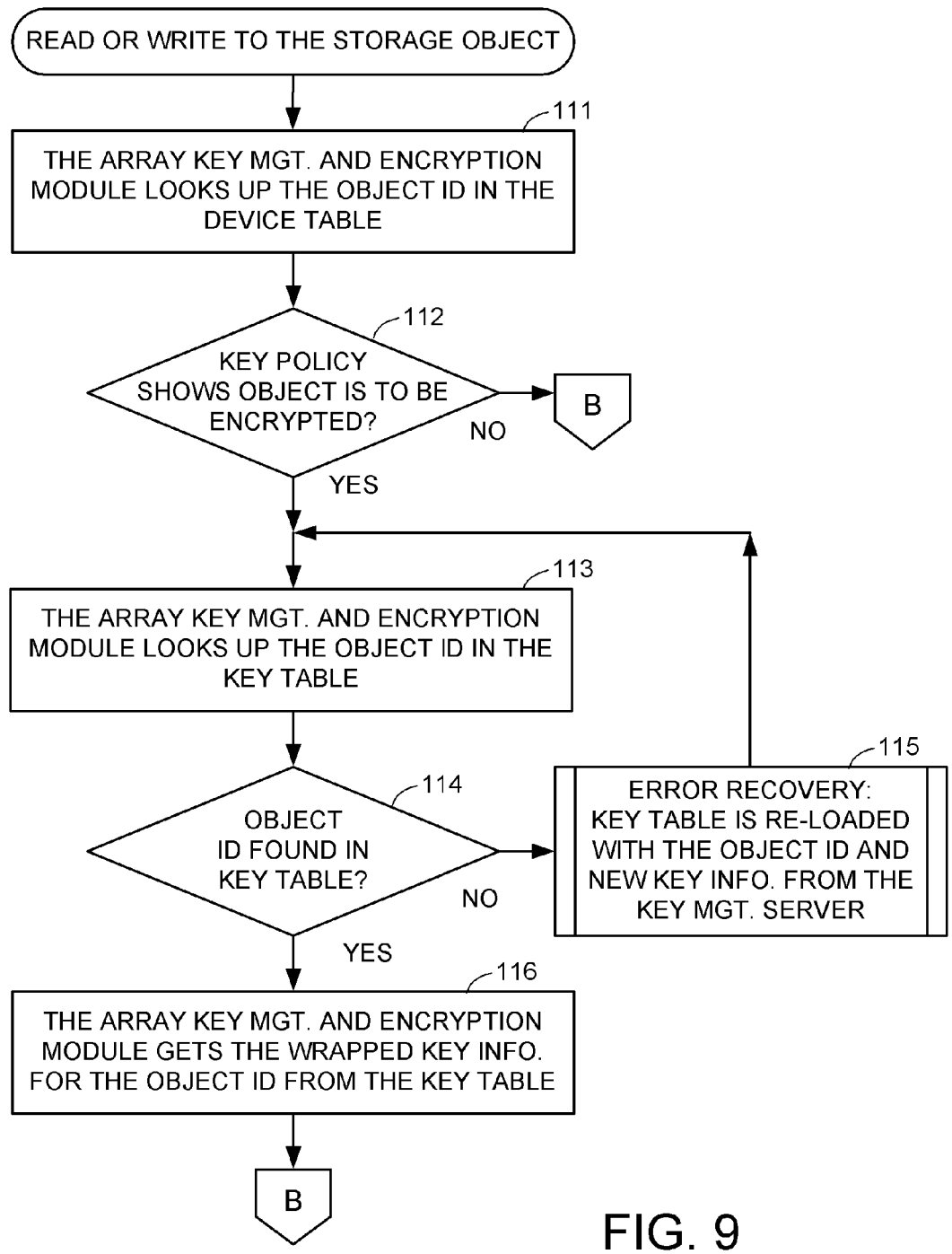
FIGS. 9 and 10 together comprise a flowchart of a procedure for reading or writing to a storage object in the data processing system of FIG. 1.
Figure 10:
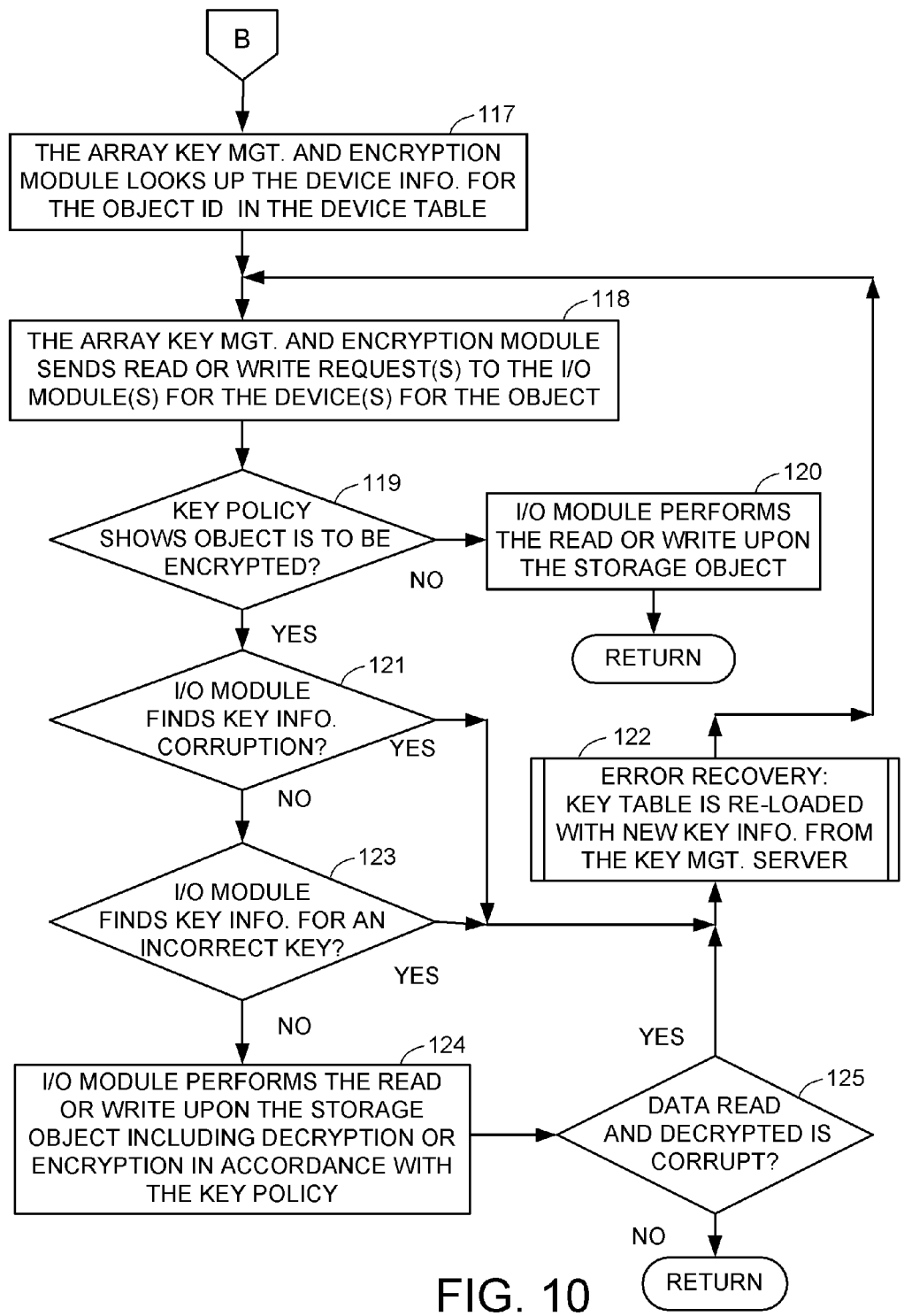

FIGS. 9 and 10 together comprise a flowchart of a procedure for reading or writing to a specified storage object in the data processing system of FIG. 1. In a first step 111, the array key management and encryption module looks up the object ID in its device table. In step 112, if the key policy in the device table shows that the object is to be encrypted, then execution continues to step 113. In step 113, the array key management and encryption module looks up the object ID in the key table. In step 114, if the object ID is not found in the key table, then execution branches to step 115 to perform error recovery. If the error recovery is successful, then the key table is re-loaded with the object ID and new key info. from the key management server, and execution loops back to step 113.

For example, in step 115, the storage processor invokes its key management client to fetch a new copy of the key information for the object ID from key management server and re-load it into the key table. If this new copy of the key information is corrupt or incorrect, then the device table of the storage processor is accessed to find the key UUID associated with the object in the device table of the storage processor, and a new copy of the key information for the key UUID is obtained from the key management server and re-loaded into the key table. If this new copy of the key information is corrupt or incorrect, then an attempt is made to get correct key information from the device table of the other storage processor in the storage system. If this new copy of the key information is corrupt or incorrect, then the device table of this other storage processor is accessed to find the key UUID associated therewith the object ID. If this key UUID is not the same as a key UUID previously found for the object ID, then it is used to fetch a new copy of the key information from the key management server. If this new copy of the key information is corrupt or incorrect, then an attempt is made to a key UUID associated with the object ID in storage of the data processing system or in an archive index or in archive storage, and if this key UUID is not the same as a key UUID previously found for the object ID, then it is used to fetch a new copy of the key information from the key management server.

In step 114, if the object ID is found in the key table, then execution continues to step 116. In step 116, the array key management and encryption module gets the wrapped key info. for the object ID from the key table, and execution continues to step 117 in FIG. 10. Execution also continues to step 117 in FIG. 10 from step 112 if the key policy for the object specifies that the object is not to be encrypted.

In step 117 of FIG. 10, the array key management and encryption module looks up the device info. for the object ID in the device table. In step 118 the array key management and encryption module sends one or more read or write requests to one or more I/O modules for accessing the disk drives storing one or more logical extents of the object. In step 119, if the key policy does not show that the object is to be encrypted, then execution branches to step 120. In step 120, the I/O module performs the read or write upon the storage object, and execution returns.

In step 119, if the key policy shows that the object is to be encrypted, then execution continues to step 121. In step 121, if any of the I/O modules finds corruption of the key information for the object, as described above with reference to FIG. 6, then execution branches from step 121 to step 122 to perform error recovery by attempting to fetch a new copy of the key information from the key management server, as described above with reference to step 115. If this error recovery is successful, then the key table is re-loaded with new key information from the key management server, and execution loops back to step 118 to re-start the I/O operation with the new key information.

In step 121, if the I/O module does not find corruption of key information, then execution continues to step 123. In step 123, if the I/O module finds that the key information is not the correct key information for the specified object ID, as described above with reference to FIG. 6, then execution branches to step 122 to perform error recovery. Otherwise, execution continues from step 123 to step 124. In step 124, the I/O module performs the read or write operation upon the storage object including decryption for a read or encryption for a write in accordance with the key policy. In step 125, for a read operation, if data read and decrypted is found to be corrupt, for example as indicted by a redundancy code or a MAC in the data, this is likely due to the wrong data encryption key being used, for example, because the data encryption key is the key for a different object in the namespace of another data storage system. In this case, execution branches from step 125 to step 122 to perform error recovery. Otherwise, execution returns from step 125.

As introduced above with reference to FIG. 1, by organizing the disk drives 33-39 into RAID sets 40 and 41, it is possible to recover from the failure or loss of a single disk drive in a RAID set. For a logical device encrypted above the RAID function, if the logical device is encrypted with the wrong data encryption key or if the logical device is encrypted with the correct data encryption key but the correct encryption key is lost, then it is not possible to decrypt the encrypted data of the logical device on any of the disk drives in the RAID set or extract any decrypted data of the logical device from the RAID set using the data rebuild mechanism of the RAID function. Thus, confusion or loss of the data encryption key becomes a single point of failure. However, by placing the encryption function below the RAID function, and requiring independence of encryption functionality along the same boundaries of data member independence of the RAID function, failures of the encryption and key management for individual encryption functions can be recovered with the same data rebuild mechanism as the RAID function.

Figure 11:
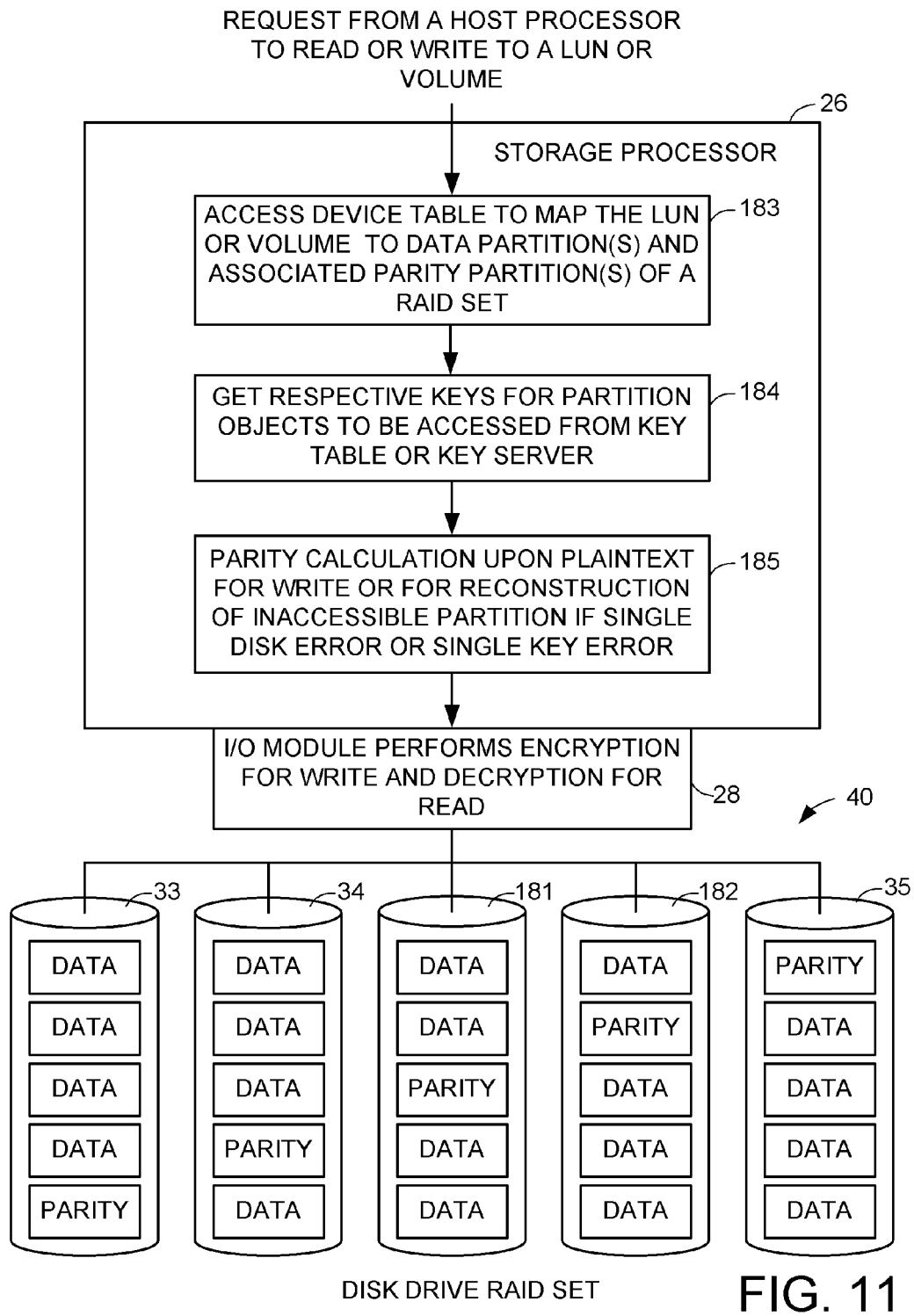
FIG. 11 shows data flow for a RAID function placed above the encryption function in a storage processor of FIG. 1 for recovery from confusion or loss of a single data encryption key.

FIG. 11 shows the storage processor 26 programmed to place the encryption function below the RAID function. In operation, the storage processor 26 receives a request from a host processor to read or write to a LUN or logical volume of data contained in the disk drive RAID set 40. The storage processor 26 performs a mapping function 183 by accessing its device table (57 in FIG. 1) to map the LUN or logical volume to one or more data partitions and one or more associated parity partitions of the RAID set 40.

In a preferred construction, each data partition and each parity partition of the RAID set 40 is a storage object using a respective data encryption key for encryption of its plaintext data from a host processor or parity calculated from plaintext host data. Therefore, the storage processor 26 performs a key fetching function 184 by fetching the respective data encryption keys for one or more data partition objects for a read or write operation and one or more parity partition objects needed for a write operation.

For a write operation or for reconstruction of data of an inaccessible partition in the RAID set, the storage processor performs a RAID function 185 including a parity calculation upon plaintext from the host or obtained by the I/O module reading encrypted data from one or more data partitions of the disk drives in the RAID set or encrypted parity of a parity partition of a disk drive in the RAID set and the I/O module decrypting the encrypted data or encrypted parity read from the disk drive.

The I/O module 28 performs encryption of plaintext for writing encrypted data or parity to the data or parity partitions of the disk drives in the RAID set 40, and performs decryption of encrypted data or parity read from the data or parity partitions of the disk drives in the RAID set.

Figure 12:
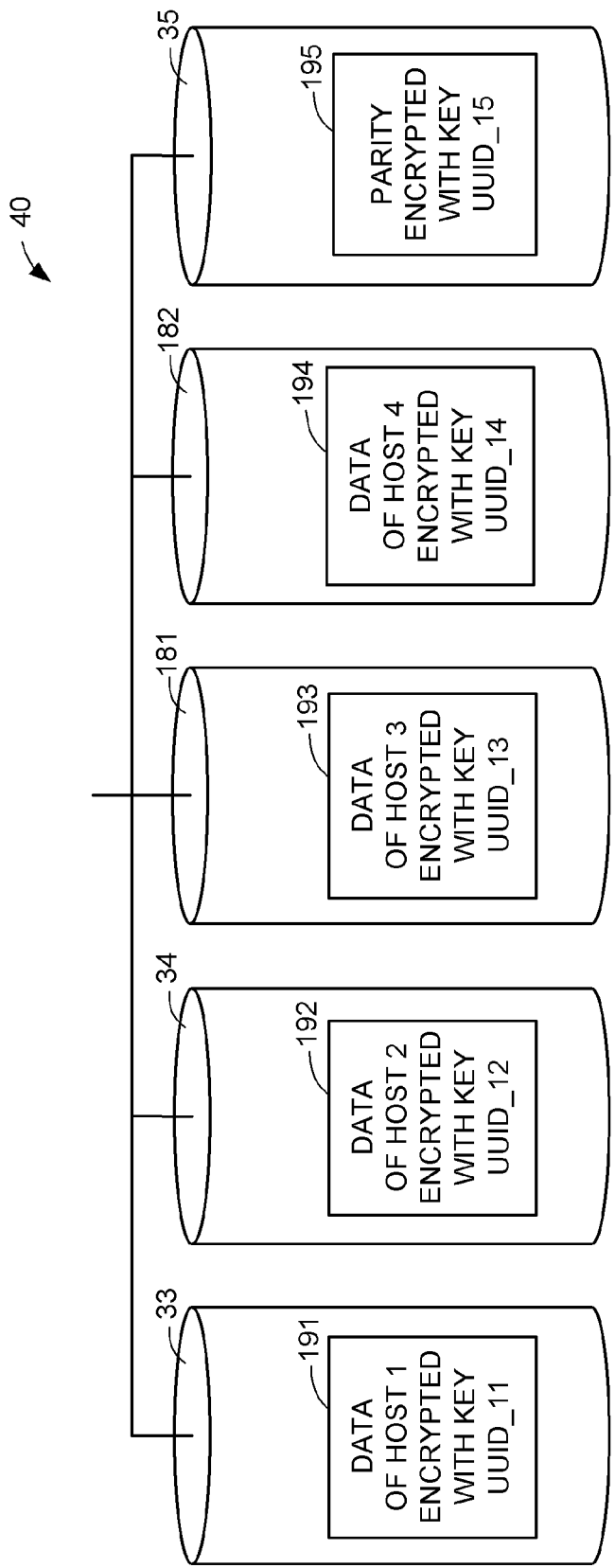
FIG. 12 shows one way of mapping host data to partitions of data storage in a RAID set of FIG. 1.

As shown in FIG. 12, for example, if a respective data encryption key (KEY UUID_11, KEY UUID_12, KEY UUID_13, KEY UUID_14, KEY UUID_15) is used for each disk drive 33, 34, 181, 182, 35 in the RAID set for producing the encrypted data 191, 192, 193, 194 or encrypted parity 195 written to the disk drive, then confusion or loss of the data encryption key for the disk drive becomes equivalent in result to loss of the disk drive. Therefore, the data rebuild mechanism of the RAID function (185 in FIG. 11) upon the plaintext obtained by decrypting data and parity from the disk drives in the RAID set can recover from the loss of the data encryption key for the disk drive in the same manner as a loss of the disk drive.

Use of a respective data encryption key for each disk drive in the RAID set, however, may compromise security so that deletion of the data encryption key for the encrypted data does not ensure against recovery of plaintext corresponding to the encrypted data. In the example of FIG. 12, deletion of the data encryption key for the host data encrypted into any one of the disk drives 33, 34, 181, 182 does not ensure against recovery of the corresponding plaintext because the rebuild mechanism of the RAID function may recover the plaintext of that disk drive by using the data encryption keys for the data of other host processors and the data encryption key of the associated parity partition 195.

At first glance, it may appear that the loss in security in the RAID organization of FIG. 12 is simply the price that must be paid for recovering from confusion or loss of a hosts' data encryption key. However, this security problem can be solved by storing a hosts' encrypted data in data partitions in different disk drives of the RAID set such that the data partitions are in the same stripe so that the data partitions are associated with the same parity partition, and by using a respective data encryption key for encrypting the data stored in each data partition and for encrypting the parity partition.

Figure 13:
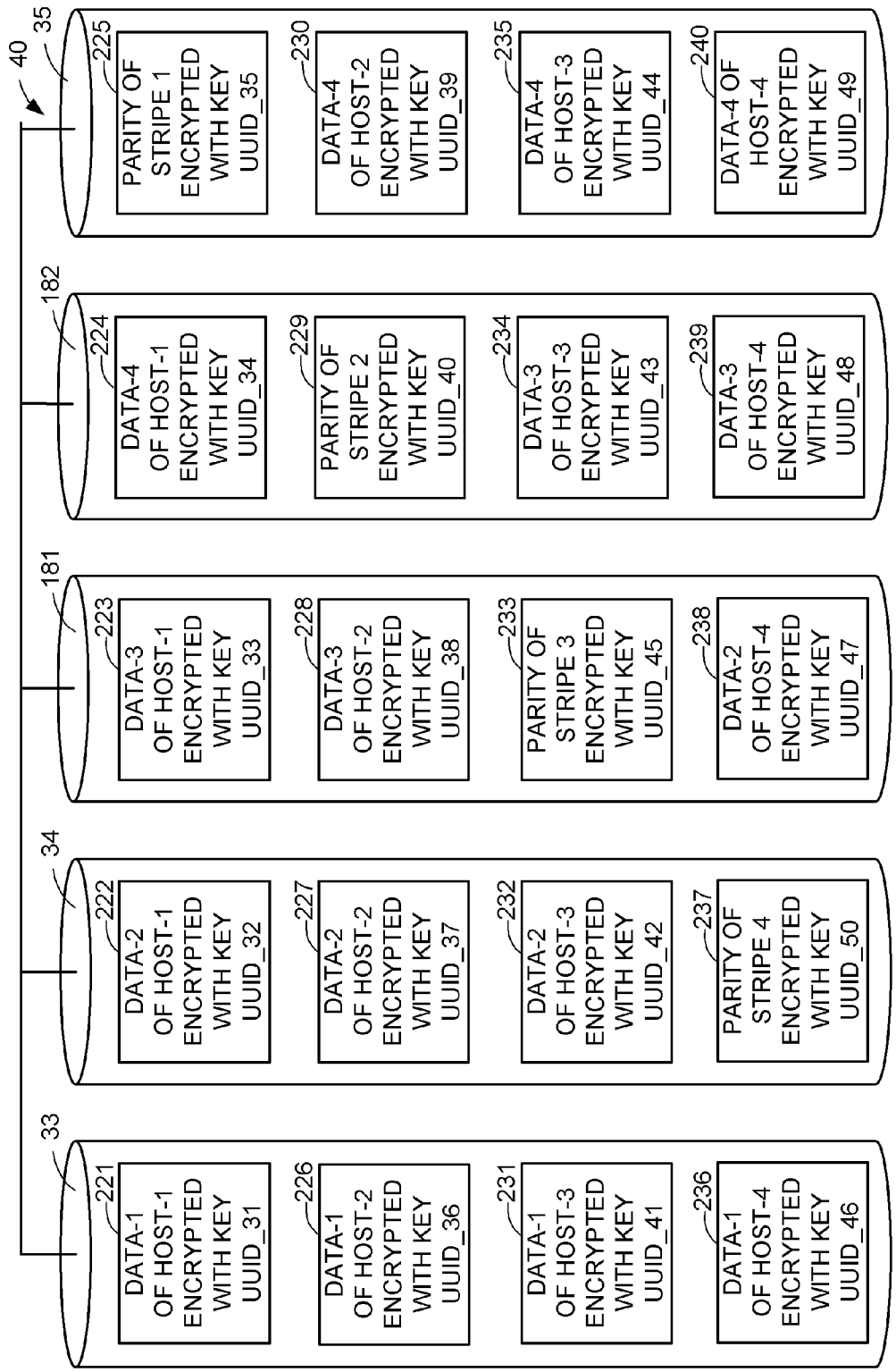
FIG. 13 shows another way of mapping host data to partitions of data storage in the RAID set of FIG. 1.

For example, as shown in FIG. 13, it is possible to recover from the loss of a single disk drive in the RAID set or from the confusion or loss of a single data encryption key for a data partition but plaintext from a host cannot be exposed by decryption of data read from the RAID set using the data encryption keys for encrypting or decrypting the data of the other host processors. In this case, each data partition and each parity partition is encrypted with a respective data encryption key as before, but in addition none of the parity partitions are associated with data partitions storing encrypted data from more than one host processor. Instead, each stripe of partitions across all of the disk drives in the RAID set stores encrypted data or parity originating from only one host processor.

In particular, in FIG. 13, a first stripe of partitions across the disk drives of the RAID set includes data partitions 221, 222, 223, and 224 in respective different disk drives 33, 34, 181, 182 and storing encrypted data from a first host (HOST-1) using respective different data encryption keys (KEY UUID_31, KEY UUID_32, KEY UUID_33, KEY UUID_34) and a parity partition 225 in the disk drive 35 and storing encrypted parity of data from the first host processor using yet another data encryption key (KEY UUID_35). A second stripe of partitions across the disk drives of the RAID set includes data partitions 226, 227, 228, and 230 in respective different disk drives 33, 34, 181, 182 and storing encrypted data from a second host processor (HOST-2) using respective different data encryption keys (KEY UUID_36, KEY UUID_37, KEY UUID_38, KEY UUID_39) and a parity partition 229 in the disk drive 182 and storing encrypted parity of data from the second host processor using yet another data encryption key (KEY UUID_40). A third stripe of partitions across the disk drives of the RAID set includes data partitions 231, 232, 234, and 235 in respective different disk drives 33, 34, 182, 35 and storing encrypted data from a third host processor (HOST-3) using respective different data encryption keys (KEY UUID_41, KEY UUID_42, KEY UUID_43, KEY UUID_44) and a parity partition 233 in the disk drive 181 and storing encrypted parity of data from the third host processor using yet another data encryption key (KEY UUID_45). A fourth stripe of partitions across the disk drives of the RAID set includes data partitions 236, 238, 239, and 240 in respective different disk drives 33, 181, 182, 35 and storing encrypted data from a fourth host processor (HOST-4) using respective different data encryption keys (KEY UUID_46 KEY UUID_47, KEY UUID_48, KEY UUID_49) and a parity partition 237 in the disk drive 34 and storing encrypted parity of data from the fourth host processor using yet another data encryption key (KEY UUID_50). Therefore, all of the data and parity in any one stripe in the RAID set belong to at most one of the host processors, and deletion of all of the data encryption keys for the data partitions and their associated parity partition in the stripe precludes exposure of the plaintext encrypted and stored in the data partitions of the stripe.

Figure 14:
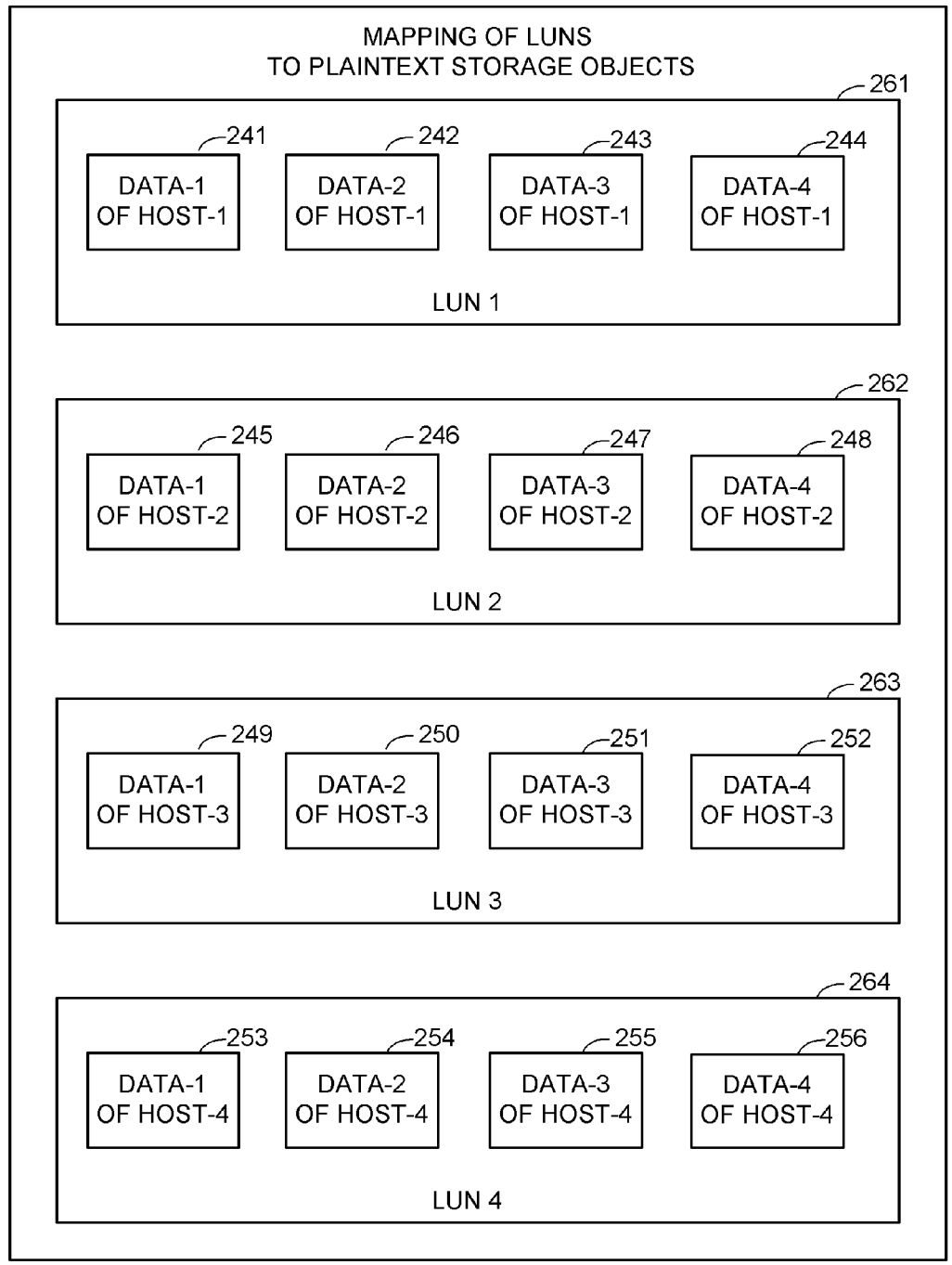
FIG. 14 shows a mapping of logical units of host data to plaintext data of the partitions shown in FIG. 13.

As shown in FIG. 14, a respective LUN assigned to each host is mapped to the data from the host so that the plaintext data of each LUN is encrypted and stored in the data partitions of a respective one of the stripes of partitions across all of the disks in the RAID set (40 of FIG. 1). Thus, a first LUN 261 stores blocks of plaintext data 241, 242, 243, 244 that is encrypted with the respective data encryption keys (KEY UUID_31, KEY UUID_32, KEY UUID_33, KEY UUID_34) and stored in the respective data partitions (221, 222, 223, and 224 in FIG. 13) of the first stripe. Parity computed from the blocks of plaintext data 241, 242, 243, 244 is encrypted with another data encryption key (KEY UUID_35) and stored in the parity partition (225 in FIG. 13) of the first stripe. A second LUN 262 stores blocks of plaintext data 245, 246, 247, 248 encrypted with the respective data encryption keys (KEY UUID_36, KEY UUID_37, KEY UUID_38, KEY UUID_39) and stored in the respective data partitions (226, 227, 228, and 230 in FIG. 13) of the second stripe. Parity computed from the blocks of plaintext data 245, 246, 247, 248 is encrypted with another data encryption key (KEY UUID_40) and stored in the parity partition (229 in FIG. 13) of the second stripe. A third LUN 263 stores blocks of plaintext data 249, 250, 251, 252 that are encrypted with the respective data encryption keys (KEY UUID_41, KEY UUID_42, KEY UUID_43, KEY UUID_44) and stored in the respective data partitions (231, 232, 234, and 235 in FIG. 13) of the third stripe. Parity computed from the blocks of plaintext data 249, 250, 251, 252 is encrypted with another data encryption key (KEY UUID_45) and stored in the parity partition (233 in FIG. 13) of the third stripe. A fourth LUN 264 stores blocks of plaintext data 253, 254, 255, 256 that are encrypted with the respective data encryption keys (KEY UUID_46, KEY UUID_47, KEY UUID_48, KEY UUID_49) and stored in the respective data partitions (236, 238, 239, and 240 in FIG. 13) of the fourth stripe. Parity computed from the blocks of plaintext data 253, 254, 255, 256 is encrypted with another data encryption key (KEY UUID_50) and stored in the parity partition (237 in FIG. 13) of the fourth stripe.

Figure 15:
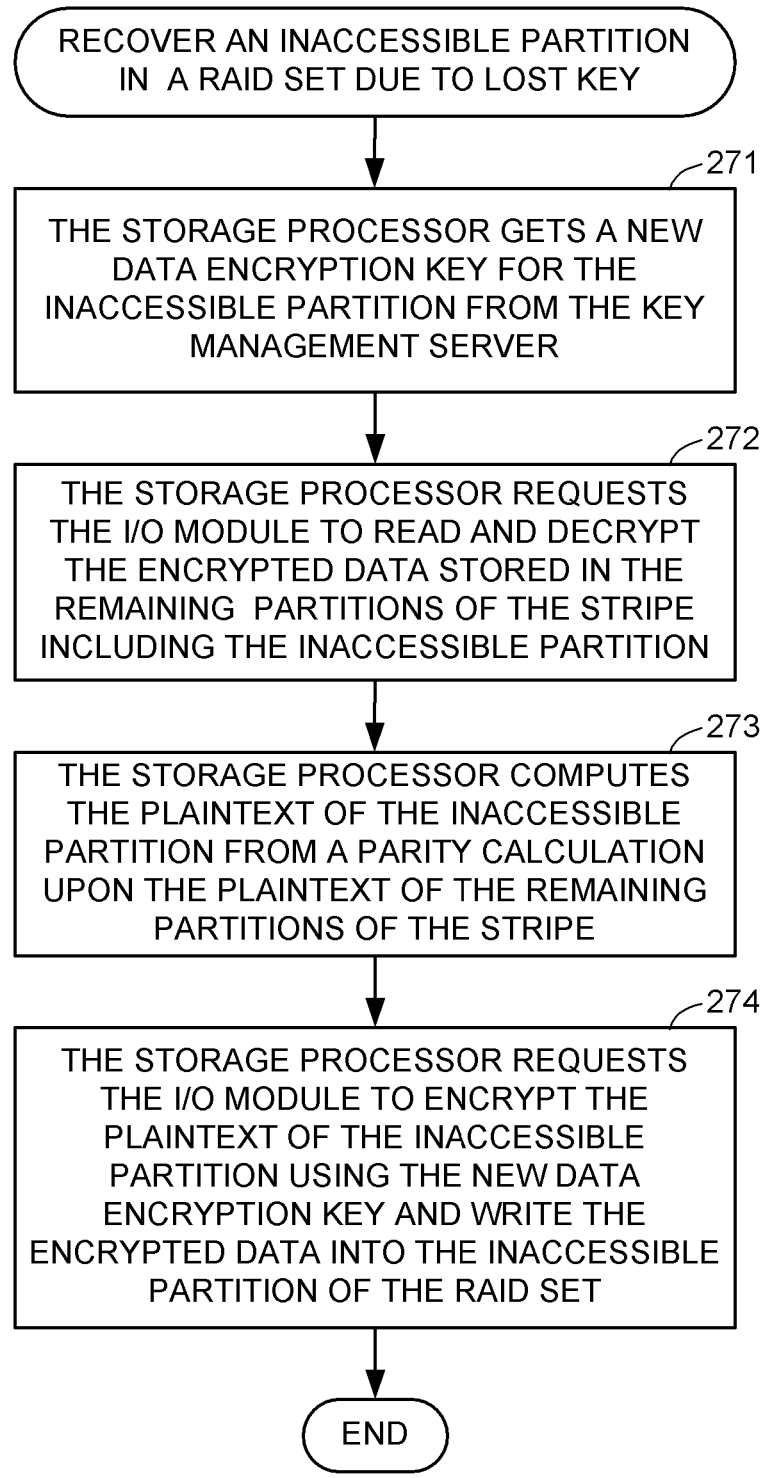
FIG. 15 is a flowchart of a procedure for recovering from an inaccessible partition in a RAID set for a storage system in which encryption is below the RAID function.

FIG. 15 shows how the storage processor recovers from an inaccessible partition in the RAID set due to loss of the data encryption key for the partition for a storage system in which the encryption function is below the RAID function. In a first step 271, the storage processor gets a new data encryption key for the inaccessible partition from the key management server. In step 272, the storage processor requests the I/O module to read and decrypt the encrypted data stored in the remaining partitions of the stripe including the inaccessible partition. In step 273, the storage processor computes the plaintext of the inaccessible partition from a parity calculation upon the plaintext of the remaining partitions of the stripe. In step 274, the storage processor requests the I/O module to encrypt the plaintext of the inaccessible partition using the new data encryption key and write the encrypted data into the inaccessible partition of the RAID set.

Figure 16:
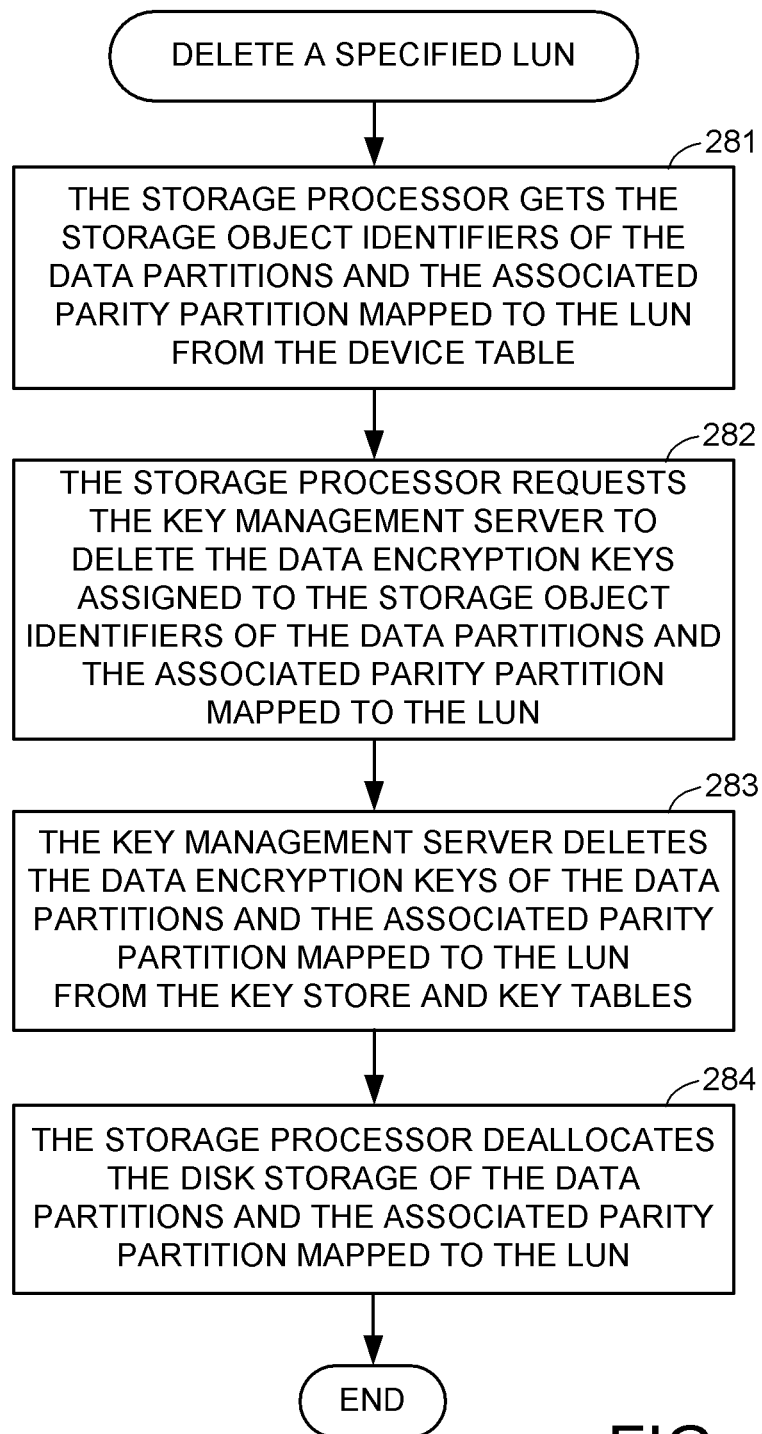
FIG. 16 is a flowchart of a procedure for deleting a LUN mapped to disk drive partitions of a RAID set as shown in FIG. 13 and FIG. 14.

FIG. 16 shows a procedure for deleting a LUN mapped to disk drive partitions of a RAID set as shown in FIG. 14 and FIG. 15. In a first step 281 of FIG. 17, the storage processor get the storage object identifiers of the data partitions and the associated parity partition mapped to the LUN from the device table. In step 282, the storage processor requests the key management server to delete the data encryption keys assigned to the storage object identifiers of the data partitions and the associated parity partition mapped to the LUN. In step 283, the key management server deletes the data encryption keys of the data partitions and the associated parity partition mapped to the LUN from its key store and from the key tables in the storage system. Finally, in step 284, the storage processor deallocates the disk storage of the data partitions and the associated parity partition mapped to the LUN. In a similar fashion, the storage processor may request the key server to change the keys for the data partitions and the parity partition of the LUN, or to change the key policy for the data partitions and the parity partition of the LUN, for example, to control the lifetime of the LUN.

To facilitate the change of a specified data encryption key to a new key, the wrapped key information field in the key store entries and the key table entries may contain wrapped key information for the new data encryption key as well as the old data encryption key. For example, an encrypted storage object can be accessed by a host processor on a priority basis concurrently with the key change while an I/O module performs a background process of decrypting the storage object with the old data encryption key and re-encrypting the storage object with the new data encryption key on a track-by-track or block-by-block basis. For example, the key store entry and key table entry includes a flag indicating whether or not a key change is in progress, and if so, the storage processor has a table or list of which tracks or blocks of the storage object are presently encrypted with the old key and which tracks or blocks are presently encrypted with the new key.

The key management server can be programmed so that key store entries for a specified data encryption key or a specified key set are invalidated but not deallocated until deallocation is approved by manual intervention of the system administrator or by a security officer. For example, if circumstances arise suggesting that a data encryption key has been compromised or a storage object has been corrupted, the key store entries of the objects using the suspect key or the suspect storage object and all of its descendants in the key set hierarchy are marked as invalid and/or in need of storage management action, and in a similar fashion the suspect keys or suspect storage objects marked as invalid in the key store can be marked as invalid and/or in need of storage management action in the key tables of the storage systems storing the objects. If the system administrator or security officer later find that the suspect keys or suspect storage objects are not compromised or have not been corrupted, then the system administrator may change the status of these entries back to valid instead of deleting them.

In view of the above, it has been shown that by placing an encryption function below a RAID function and requiring independence of encryption functionality along the same boundaries of data member independence of the RAID function, failures of the encryption and key management for individual encryption functions can be recovered with the same data rebuild mechanism as the RAID function. For example, in a RAID set of disk drives, each data partition and each parity partition has a respective data encryption key for storing encrypted data or encrypted parity in the partition, and a LUN or logical volume is mapped to a stripe of data partitions and an associated parity partition across the disks in the RAID set so that the data rebuild mechanism of the RAID function may recover from a loss of a single data encryption key without compromising security of the LUN or logical volume. Deletion of all of the data encryption keys for the data partitions and their associated parity partition in a stripe across the disks in the RAID set precludes exposure of the plaintext encrypted and stored in the data partitions of the stripe.

What is claimed is:

1. A method of storing redundant encrypted data, said method comprising:

computing parity from a first data member and a second data member, encrypting the first data member with a first data encryption key and storing the encrypted first data member in a first data storage device, encrypting the second data member with a second data encryption key and storing the encrypted second data member in a second data storage device, and encrypting the parity with a third data encryption key and storing the encrypted parity in a third data storage device, wherein the first data encryption key is not identical to the second data encryption key, the second data encryption key is not identical to the third data encryption key, and the third data encryption key is not identical to the first data encryption key; and recovering from a failure to read and decrypt data from the encrypted data member in one of the first data storage device and the second data storage device by reading and decrypting data from the other of the first data storage device and the second data storage device and by reading and decrypting parity from the third data storage device and performing a parity computation upon the decrypted data from said other of the first data storage device and the second data storage device and the decrypted parity from the third data storage device; and which further includes detecting a loss of a proper key for decrypting data read from the encrypted data member in said one of the first data storage device and the second data storage device, and in response to detecting the loss of a proper key for decrypting data read from the encrypted data member in said one of the first data storage device and the second data storage device, recovering from the loss of a proper key for decrypting data read from the encrypted data member in said one of the first data storage device and the second data storage device by:

assigning a new data encryption key to said one of the first data storage device and the second data storage device;

recovering the data member stored in encrypted form in said one of the first data storage device and the second data storage device by reading and decrypting data from the other of the first data storage device and the second data storage device and reading and decrypting parity from the third data storage device and performing a parity computation upon the decrypted data from said other of the first data storage device and the second data storage device and the decrypted parity from the third data storage device in order to compute the recovered data member; and encrypting the recovered data member with the new data encryption key and storing the encrypted recovered data member in said one of the first data storage device and the second data storage device.

2. The method as claimed in claim 1, which further includes deleting the first data encryption key, the second data encryption key, and the third data encryption key, so that plaintext of the encrypted first data member stored in the first data storage device and plaintext of the second encrypted data member stored in the second data storage device cannot be exposed prior to any deletion of the encrypted first data member from the first data storage device and any deletion of the second encrypted data member from the second data storage device.

3. The method as claimed in claim 1, which further includes assigning a logical unit number (LUN) or logical volume of storage to a host processor and mapping the LUN or logical volume of storage to the first data member and the second data member and providing the host processor with read and write data access to the LUN or logical volume by providing the host processor with read and write access to the first data storage device and the second data storage device, and wherein the parity is not computed from data of any other host processor.

4. The method as claimed in claim 1, wherein each of the first data storage device, the second data storage device, and the third data storage device includes a first partition of storage and a second partition of storage, and each partition of storage contains either encrypted data or encrypted parity that has been encrypted with a respective different data encryption key for each partition of each of the storage devices, wherein the parity encrypted in one of the first partitions is computed from the data that is encrypted and stored in the other of the first partitions, and the parity encrypted in one of the second partitions is computed from the data that is encrypted and stored in the other of the second partitions.

5. The method as claimed in claim 4, which further includes assigning a first logical unit number (LUN) or logical volume of storage to a first host processor and mapping the first LUN or logical volume of storage to the first partitions and providing the first host processor with read and write data access to the first logical unit number (LUN) or logical volume of storage by providing the first host processor with read and write data access to the first partitions containing encrypted data, and assigning a second logical unit number (LUN) or logical volume of storage to a second host processor and mapping the second LUN or logical volume of storage to the second partitions and providing the second host processor with read and write data access to the second LUN or logical volume of storage by providing the second host processor with read and write data access to the second partitions containing encrypted data.

6. The method as claimed in claim 1, which further includes attempting to recover the proper key from a key server in response to detecting the loss of a proper key for decrypting data read from the encrypted data member in said one of the first data storage device and the second data storage device.

7. A redundant storage system for storing encrypted data, said redundant storage system comprising:
an array of data storage devices including at least a first data storage device, a second data storage device, and a third data storage device; and
at least one data processor coupled to the data storage devices for storing encrypted data in the data storage devices;
wherein said at least one data processor is programmed to compute parity from a first data member and a second data member to encrypt the first data member with a first data encryption key and to store the encrypted first data member in the first data storage device, to encrypt the second data member with a second data encryption key and to store the encrypted second data member in the second data storage device, and to encrypt the parity with a third data encryption key and to store the encrypted parity in the third data storage device, wherein the first data encryption key is not identical to the second data encryption key, the second data encryption key is not identical to the third data encryption key, and the third data encryption key is not identical to the first data encryption key;
wherein said at least one data processor is further programmed to recover from a failure to read and decrypt data from the encrypted data member in one of the first data storage device and the second data storage device by reading and decrypting data from the other of the first data storage device and the second data storage device and by reading and decrypting parity from the third data storage device and performing a parity computation upon the decrypted data from said other of the first data storage device and the second data storage device and the decrypted parity from the third data storage device; and
wherein said at least one data processor is further programmed to detect a loss of a proper key for decrypting data read from the encrypted data member in said one of the first data storage device and the second data storage device, and in response to detecting the loss of a proper key for decrypting data read from the encrypted data member in said one of the first data storage device and the second data storage device, to recover from the loss of a proper key for decrypting data read from the encrypted data member in said one of the first data storage device and the second data storage device by:
assigning a new data encryption key to said one of the first data storage device and the second data storage device;
recovering the data member stored in encrypted form in said one of the first data storage device and the second data storage device by reading and decrypting data from the other of the first data storage device and the second data storage device and reading and decrypting parity from the third data storage device and performing a parity computation upon the decrypted data from said other of the first data storage device and the second data storage device and the decrypted parity from the third data storage device in order to compute the recovered data member; and
encrypting the recovered data member with the new data encryption key and storing the encrypted recovered data member in said one of the first data storage device and the second data storage device.

8. The redundant storage system as claimed in claim 7, wherein said at least one data processor includes at least one input-output module coupled to the data storage devices for writing encrypted data to the data storage devices and reading encrypted data from the data storage devices, and wherein said at least one data processor is programmed to perform encryption and decryption by sending a request including a data encryption key to said at least one input-output module.

9. The redundant storage system as claimed in claim 7, which is further programmed to delete the first data encryption key, the second data encryption key, and the third data encryption key, so that plaintext of the encrypted first data member stored in the first data storage device and plaintext of the second encrypted data member stored in the second data storage device cannot be exposed prior to any deletion of the encrypted first data member from the first data storage device and any deletion of the second encrypted data member from the second data storage device.

10. The redundant storage system as claimed in claim 7, which is further programmed to assign a logical unit number (LUN) or logical volume of storage to a host processor and to assign the LUN or logical volume of storage to the first data member and the second data member and to provide the host processor with read and write data access to the LUN or logical volume by providing the host processor with read and write access to the first data storage device and the second data storage device, and wherein the parity is not computed from data from any other host processor.

11. The redundant storage system as claimed in claim 7, wherein each of the first data storage device, the second data storage device, and the third data storage device includes a first partition of storage and a second partition of storage, and each partition of storage contains either encrypted data or encrypted parity that has been encrypted with a respective different data encryption key for each partition of each of the storage devices, wherein the parity encrypted in one of the first partitions has been computed from the data that is encrypted and stored in the other of the first partitions, and the parity encrypted in one of the second partitions has been computed from the data that is encrypted and stored in the other of the second partitions.

12. The redundant storage system as claimed in claim 11, which is further programmed to assign a first logical unit number (LUN) or logical volume of storage to a first host processor and to map the first LUN or logical volume of storage to the first partitions and to provide the first host processor with read and write data access to the first logical unit number (LUN) or logical volume of storage by providing the first host processor with read and write data access to the first partitions, and to assign a second logical unit number (LUN) or logical volume of storage to a second host processor and to map the second LUN or logical volume of storage to the second partitions and to provide the second host processor with read and write data access to the second LUN or logical volume of storage by providing the second host processor with read and write data access to the second partitions.

13. The redundant storage system as claimed in claim 7, wherein the first data storage device is a first disk drive, the second data storage device is a second disk drive, and the third data storage device is a third disk drive.

14. The redundant storage system as claimed in claim 7, wherein the data processor is further programmed to attempt to recover the proper key from a key server in response in response to detecting the loss of a proper key for decrypting data read from the encrypted data member in said one of the first data storage device and the second data storage device.

15. A redundant storage system containing encrypted data, said redundant storage system comprising:
 an array of disk drives including at least a first disk drive, a second disk drive, and a third disk drive, and
 at least one data processor coupled to the disk drives for accessing encrypted data in the disk drives;
 wherein each disk drive includes at least a first partition of data storage and a second partition of data storage;
 wherein each partition of data storage contains encrypted data or encrypted parity that has been encrypted with a respective different data encryption key for each partition of each of the disk drives so that the data encryption key for each one of the partitions is not identical to the data encryption key for any of the other partitions, parity encrypted in one of the first partitions having been computed from the data that is encrypted and stored in the other of the first partitions, and parity encrypted in one of the second partitions having been computed from the data that is encrypted and stored in the other of the second partitions;
 wherein said at least one data processor is programmed to recover from a failure to read and decrypt encrypted data in any one of the partitions by reading and decrypting encrypted parity that was computed from the data encrypted in said any one of the partitions and by reading and decrypting encrypted data from other partitions from which the decrypted parity was computed and by performing a parity computation upon the decrypted data and the decrypted parity; and
 wherein said at least one data processor is further programmed to detect a loss of a proper key for decrypting data read from said any one of the partitions, and in response to detecting the loss of a proper key for decrypting data read from said any one of the partitions, to recover from the loss of a proper key for decrypting data read from said any one of the partitions by:
 assigning a new data encryption key to said any one of the partitions;
 recovering the data stored in encrypted form in said any one of the partitions by reading and decrypting encrypted parity that was computed from the data encrypted in said any one of the partitions and by reading and decrypting encrypted data from other partitions from which the decrypted parity was computed and by performing a parity computation upon the decrypted data and the decrypted parity in order to compute the recovered data stored in encrypted form in said any one of the partitions; and
 encrypting the recovered data with the new data encryption key and storing the encrypted recovered data in said any one of the partitions; and
 which is further programmed to assign a first logical unit number (LUN) or logical volume of storage to a first host processor and to map the LUN or logical volume of storage to the first partitions and to provide the first host processor with read and write data access to the first LUN or logical volume by providing the first host processor with read and write access to encrypted data in the first partitions, and wherein the parity encrypted in said one of the first partitions is not computed from data of any other host processor; and
 which is further programmed to assign a second logical unit number (LUN) or logical volume of storage to a second host processor and to map the second LUN or logical volume of storage to the second partitions and to provide the second host processor with read and write data access to the LUN or logical volume by providing the second host processor with read and write access to encrypted data in the second partitions, and wherein the parity encrypted in said one of the second partitions is not computed from data of any other host processor.

16. The redundant storage system as claimed in claim 15, wherein said at least one data processor is further programmed to compute parity from a first data member and a second data member, to encrypt the first data member with a first data encryption key and to store the encrypted first data member in the first partition of the first disk drive, to encrypt the second data member with a second data encryption key and to store the encrypted second data member in the first partition of the second disk drive, and to encrypt the parity with a third data encryption key and to store the encrypted parity in the first partition of the third disk drive.

17. The redundant storage system as claimed in claim 15, which is further programmed to delete the data encryption key for the first partition of the first disk drive, to delete the data encryption key for the first partition of the second disk drive, and to delete the data encryption key for the first partition of the third disk drive, so that plaintext of the encrypted data stored in the first partitions cannot be exposed prior to any deletion of the encrypted data stored in the first partitions.

18. The redundant storage system as claimed in claim 15, wherein the data processor is further programmed to attempt to recover the proper key from a key server in response to detecting the loss of a proper key for decrypting data read from said any one of the partitions.

* * * * *